US012704743B2

(12) United States Patent
Seo et al.

(10) Patent No.: US 12,704,743 B2
(45) Date of Patent: Aug. 11, 2026

(54) CAMERA MODULE

(71) Applicant: SAMSUNG ELECTRO-MECHANICS CO., LTD., Suwon-si (KR)

(72) Inventors: Bo Sung Seo, Suwon-si (KR); Byung Gi An, Suwon-si (KR); Hwan Jun Kang, Suwon-si (KR); Young Bok Yoon, Suwon-si (KR); Jun Sup Shin, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 858 days.

(21) Appl. No.: 17/508,118

(22) Filed: Oct. 22, 2021

(65) Prior Publication Data

US 2022/0163814 A1 May 26, 2022

(30) Foreign Application Priority Data

Nov. 20, 2020 (KR) ........................ 10-2020-0157028
Jun. 14, 2021 (KR) ........................ 10-2021-0076906

(51) Int. Cl.
*G02B 27/64* (2006.01)
*H04N 23/54* (2023.01)
(Continued)

(52) U.S. Cl.
CPC ........... *G02B 27/646* (2013.01); *H04N 23/54* (2023.01); *H04N 23/685* (2023.01); *G02B 7/09* (2013.01);
(Continued)

(58) Field of Classification Search
CPC ...... G02B 27/646; G02B 7/09; H04N 23/685; H04N 23/54; G03B 3/10; G03B 5/02; G03B 2205/0069
See application file for complete search history.

(56) References Cited

U.S. PATENT DOCUMENTS 7,519,282 B2 4/2009 Shin et al.
10,747,013 B2 8/2020 Lim
(Continued)

FOREIGN PATENT DOCUMENTS

CN 106707454 A 5/2017
CN 107277307 A 10/2017
(Continued)

OTHER PUBLICATIONS

Korean Office Action issued on Jul. 7, 2022, in counterpart Korean Patent Application No. 10-2021-0076906 (6 Pages in English, 4 Pages in Korean).

(Continued)

*Primary Examiner* — Stephanie E Bloss
*Assistant Examiner* — Fang-Chi Chang
(74) *Attorney, Agent, or Firm* — NSIP Law

(57) ABSTRACT

A camera module includes: an optical image stabilization (OIS) base; an OIS holder movably coupled to the OIS base in a first direction perpendicular to an optical axis, and fixedly coupled to an image sensor; and a first OIS actuator configured to shift the image sensor in the first direction. The first OIS actuator includes a first coil and a first magnet opposing each other in one of the first direction and a second direction perpendicular to the optical axis and intersecting the first direction. The first coil is disposed at one of the OIS holder and the OIS base, and the first magnet is disposed at the other of the OIS holder and the OIS base.

19 Claims, 9 Drawing Sheets

(51) Int. Cl.
*H04N 23/68* (2023.01)
*G02B 7/09* (2021.01)
*G03B 3/10* (2021.01)

(52) U.S. Cl.
CPC ........ *G03B 3/10* (2013.01); *G03B 2205/0069* (2013.01)

(56) References Cited

U.S. PATENT DOCUMENTS

| | | | | |
|---|---|---|---|---|
| 2006/0269262 | A1 | 11/2006 | Shin et al. | |
| 2006/0269263 | A1 | 11/2006 | Kim et al. | |
| 2007/0025710 | A1 | 2/2007 | Shin et al. | |
| 2017/0139225 | A1* | 5/2017 | Lim | H04N 23/687 |
| 2017/0285362 | A1 | 10/2017 | Hu et al. | |
| 2018/0246341 | A1 | 8/2018 | Jung et al. | |
| 2019/0141248 | A1 | 5/2019 | Hubert et al. | |
| 2019/0235202 | A1 | 8/2019 | Smyth et al. | |

FOREIGN PATENT DOCUMENTS

| | | | | |
|---|---|---|---|---|
| CN | 108780207 | A | | 11/2018 |
| CN | 209102990 | U | | 7/2019 |
| CN | 111819834 | A | | 10/2020 |
| JP | 2012-103376 | A | | 5/2012 |
| JP | 2019-512734 | A | | 5/2019 |
| KR | 10-2006-0122237 | A | | 11/2006 |
| KR | 10-0646560 | B1 | | 11/2006 |
| KR | 10-2006-0124418 | A | | 12/2006 |
| KR | 10-2006-0131488 | A | | 12/2006 |
| KR | 10-0663276 | B1 | | 1/2007 |
| KR | 10-2007-0014919 | A | | 2/2007 |
| KR | 10-2007-0070145 | A | | 7/2007 |
| KR | 10-2018-0099513 | A | | 9/2018 |
| KR | 20180099513 | A | * | 9/2018 |
| KR | 20200002357 | A | * | 1/2020 |
| KR | 10-2020-0092924 | A | | 8/2020 |
| KR | 10-2146385 | B1 | | 8/2020 |
| WO | WO 2017/156462 | A1 | | 9/2017 |

OTHER PUBLICATIONS

Chinese Office Action issued on Apr. 1, 2024, in counterpart Chinese Patent Application No. 202111384767.5 (5 pages in English, 9 pages in Chinese).

* cited by examiner

CAMERA MODULE

CROSS-REFERENCE TO RELATED APPLICATIONS

This application claims the benefit under 35 U.S.C. § 119(a) of Korean Patent Application No. 10-2020-0157028 filed on Nov. 20, 2020 and Korean Patent Application No. 10-2021-0076906 filed on Jun. 14, 2021 in the Korean Intellectual Property Office, the entire disclosures of which are incorporated herein by reference for all purposes.

BACKGROUND

1. Field

This disclosure relates to a camera, and for example, to a camera having an autofocusing function or an optical image stabilization function.

2. Description of Related Art

A camera module disposed at a mobile device may be manufactured to have a degree of performance comparable to that of a general camera. For example, as the frequency of capturing images using a mobile device has increased, demand for a camera module capable of providing high zoom magnification has also increased.

To increase zoom magnification, the distance in which light incident to a camera moves to an image sensor, that is, a total length or a total track length (TTL), may need to increase. Additionally, to implement a relatively long total track length, a length of the camera may need to increase. Generally, a camera disposed in an electronic device such as a smartphone may include a lens and an image sensor arranged in a direction toward a front surface or a rear surface of the electronic device. However, to increase a total track length, the distance between an object-side lens and an image sensor may need to increase, which may increase a size of a region between a front surface or a rear surface of the electronic device. That is, increasing the total track length may increase a thickness of the electronic device.

To provide a high zoom magnification without significantly increasing the thickness of the electronic device, a camera module may include a reflective member such as a prism for switching a path of light. For example, a path of light entering from a rear surface of an electronic device may be changed by about 90 degrees by the reflective member.

An image sensor may be shifted to provide an autofocusing (AF) function or an optical image stabilization (OIS) function in a folded camera including a reflective member.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: an optical image stabilization (OIS) base; an OIS holder movably coupled to the OIS base in a first direction perpendicular to an optical axis, and fixedly coupled to an image sensor; and a first OIS actuator configured to shift the image sensor in the first direction. The first OIS actuator includes a first coil and a first magnet opposing each other in either one of the first direction and a second direction perpendicular to the optical axis and intersecting the first direction. The first coil is disposed at one of the OIS holder and the OIS base, and the first magnet is disposed at the other of the OIS holder and the OIS base.

The camera module may further include: an auto focus (AF) base; an AF carrier movably coupled to the AF base and accommodating a lens module; and an AF actuator configured to move the lens module in a direction parallel to the optical axis, and including an AF coil disposed at the AF base, and an AF magnet disposed at the AF carrier.

The camera module may further include a ball member disposed between the OIS holder and the OIS base. The AF base may be disposed in a third direction that an imaging plane of the image sensor faces with respect to the OIS base. The OIS base, the ball member, and the OIS holder may be stacked in order in the third direction.

The camera module may further include a yoke disposed at the OIS base and opposing the first magnet in the third direction. The OIS holder may be configured to be pulled in a direction opposite to the third direction, by attractive force between the yoke and the first magnet.

The camera module may further include an OIS cover disposed between the OIS base and the AF base, and configured to prevent the OIS holder from being separated in the third direction.

The camera module may further include a ball member disposed between the OIS holder and the OIS base. The AF base may be disposed in a third direction that an imaging plane of the image sensor faces with respect to the OIS base. The OIS base, the ball member, and the OIS holder may be stacked in order in a direction opposite to the third direction.

The camera module may further include: a yoke disposed at the OIS base and opposing the first magnet in the third direction. The OIS holder may be configured to be pulled in the third direction by attractive force between the yoke and the first magnet.

The OIS holder may be movably coupled to the OIS base in the second direction. The camera module further may further include a second OIS actuator configured to shift the image sensor in the second direction. The second OIS actuator may include a second magnet and a second coil opposing each other in either one of the first direction and the second direction. The second coil may be disposed at one of the OIS holder and the OIS base, and the second magnet may be disposed at the other of the OIS holder and the OIS base.

The camera module may further include: an OIS guide interposed between the OIS base and the OIS holder; a first ball member disposed between the OIS base and the OIS guide; and a second ball member disposed between the OIS guide and the OIS holder.

The first ball member may be disposed at the OIS base or the OIS guide and may be configured to roll along a first guide groove extending in one direction among the first direction and the second direction. The second ball member may be disposed at the OIS holder or the OIS guide and may be configured to roll along a second guide groove extending in the other direction among the first direction and the second direction.

The camera module may further include: a reflective member configured to change a direction of light incident to the image sensor.

The camera module may further include: a lens module disposed at one side of the reflective member. The reflective member may be configured to change light passing through the lens module to be directed to the image sensor.

The camera module may further include a ball member disposed between the OIS holder and the OIS base. The reflective member may be disposed in a third direction toward the imaging plane of the image sensor with respect to the OIS base. The OIS base, the ball member, and the OIS holder may be stacked in order in the third direction.

The camera module may further include an OIS cover disposed on the OIS base and configured to prevent the OIS holder from being separated in the third direction.

The camera module may further include a ball member disposed between the OIS holder and the OIS base. The AF base may be disposed in a third direction that an imaging plane of the image sensor faces with respect to the OIS base. The OIS base, the ball member, and the OIS holder may be stacked in order in a direction opposite to the third direction.

In another general aspect, a camera module includes: a lens module configured to move in an optical axis direction; an OIS base; an OIS holder movably coupled to the OIS base in at least one direction perpendicular to the optical axis and fixedly coupled to the image sensor; and an OIS actuator configured to shift the image sensor in the at least one direction perpendicular to the optical axis. Either one of the OIS base and the OIS holder may include a receiving portion extending in a direction parallel to the optical axis to receive a portion of the lens module.

The OIS actuator may be disposed in the OIS base and the OIS holder.

The OIS actuator may include a coil disposed at one of the OIS holder and the OIS base, and a magnet disposed at the other of the OIS holder and the OIS base. The coil and the magnet may oppose each other in a direction among the at least one direction perpendicular to the optical axis.

In another general aspect, a camera module includes: an optical image stabilization (OIS) base; an OIS holder coupled to the OIS base; an image sensor attached to OIS holder and configured to move together with the OIS holder; an OIS actuator configured to move the OIS holder with respect to the OIS base in first and second directions perpendicular to a direction in which light is incident to the image sensor. The OIS actuator includes a first coil and a first magnet opposing each other in the first direction. The first coil is disposed at one of the OIS holder and the OIS base, and the first magnet is disposed at the other of the OIS holder and the OIS base.

The OIS actuator may further include a second coil and a second magnet opposing each other in the second direction.

The camera module may further include: an auto focus (AF) base; an AF carrier movably coupled to the AF base and accommodating a lens module; and an AF actuator configured to move the lens module in a direction parallel to an optical axis.

The camera module may further include: an OIS guide disposed between the OIS base and the OIS holder; a first ball member disposed between the OIS base and the OIS guide; and a second ball member disposed between the OIS guide and the OIS holder.

The OIS holder may be configured to move with respect to the OIS guide in one of the first and second directions. The OIS guide is configured to move with respect to the OIS base in the other of the first and second directions.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
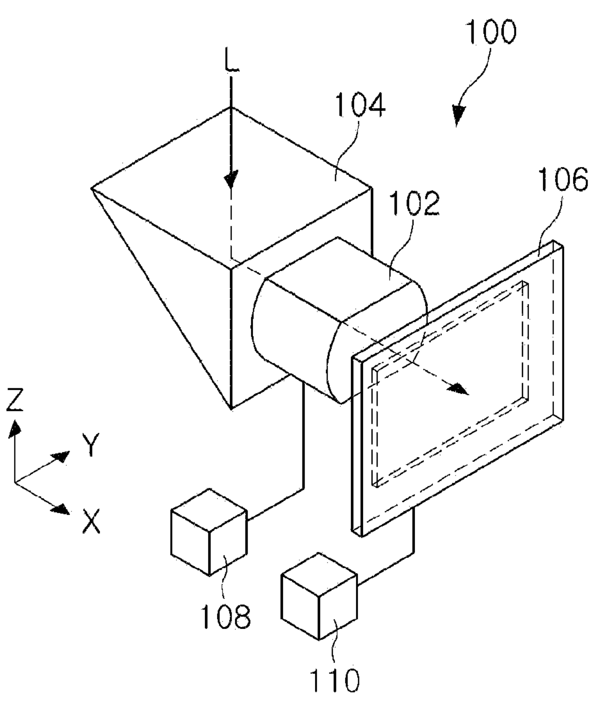
FIG. 1 is a perspective diagram illustrating a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the disclosure herein, a shape of elements or a relationship between the elements is described using an X, Y, Z coordinate system. In the disclosure herein, the X direction may be a direction parallel to the X axis, and unless otherwise indicated, the X direction may include both the +X direction and the −X direction. Similarly, the Y direction may be a direction parallel to the Y axis, and unless otherwise indicated, the Y direction may include both the +Y direction and the −Y direction. Likewise, the Z direction may be a direction parallel to the Z axis, and unless otherwise indicated, the Z direction may include both the +Z direction and the −Z direction.

FIG. 1 is a perspective diagram illustrating a camera module 100, according to an embodiment.

In an embodiment, the camera module 100 may include a lens module 102 and an image sensor 106. The lens module 102 may include at least one lens. The lens module 102 may include a lens barrel configured to accommodate the lens. In embodiments in which the lens module 102 includes several lenses, the lenses may be sequentially arranged in one direction, and the direction in which the lenses are sequentially arranged may be defined as an optical axis of the lens module 102. For example, the lenses may be sequentially arranged in a direction parallel to the X-axis.

In an embodiment, the camera module 100 may further include a reflective member 104. The reflective member 104 may reflect light incident in one direction to travel in another direction. The reflective member 104 may include, for example, a prism or a mirror. The light may be directed toward the lens module 102 by the reflective member 104. The reflective member 104 may reflect light parallel to or substantially parallel to the optical axis of the lens module 102. For example, light incident to the reflective member 104 in a direction parallel to the Z direction may be changed to travel in the X direction, parallel to the optical axis of the lens module 102. The light may pass through the lens module 102 and may reach an imaging plane of the image sensor 106.

In an embodiment, the camera module 100 may have an autofocusing (AF) function. To perform the AF function, the lens module 102 may move in a direction parallel to the optical axis with respect to the image sensor 106, and, accordingly, a focal length may be adjusted. The camera module 100 may include an AF driver 108 configured to move the lens module 102. The AF driver 108 may include, for example, structures configured to guide the movement of the lens module 102, and an actuator configured to move the lens module 102. Example components included in the AF driver 108 will be described with reference to FIGS. 2 to 5. Additionally or alternatively, the AF function may be implemented by movement of the image sensor 106. For example, the focal length may be adjusted as the image sensor 106 moves in a direction parallel to the optical axis with respect to the lens module 102.

In an embodiment, the camera module 100 may have an optical image stabilization (OIS) function. An OIS function may be implemented by shifting the lens module 102 or the image sensor 106 in a direction perpendicular to the optical axis. For example, the image sensor 106 may be shifted on the Y-Z plane. The camera module 100 may include an OIS driver 110 for optical image stabilization. The OIS driver 110 may be configured to move the image sensor 106 on the Y-axis and/or the Z direction. The OIS driver 110 will be further described with reference to FIGS. 2 to 5.

Figure 2:
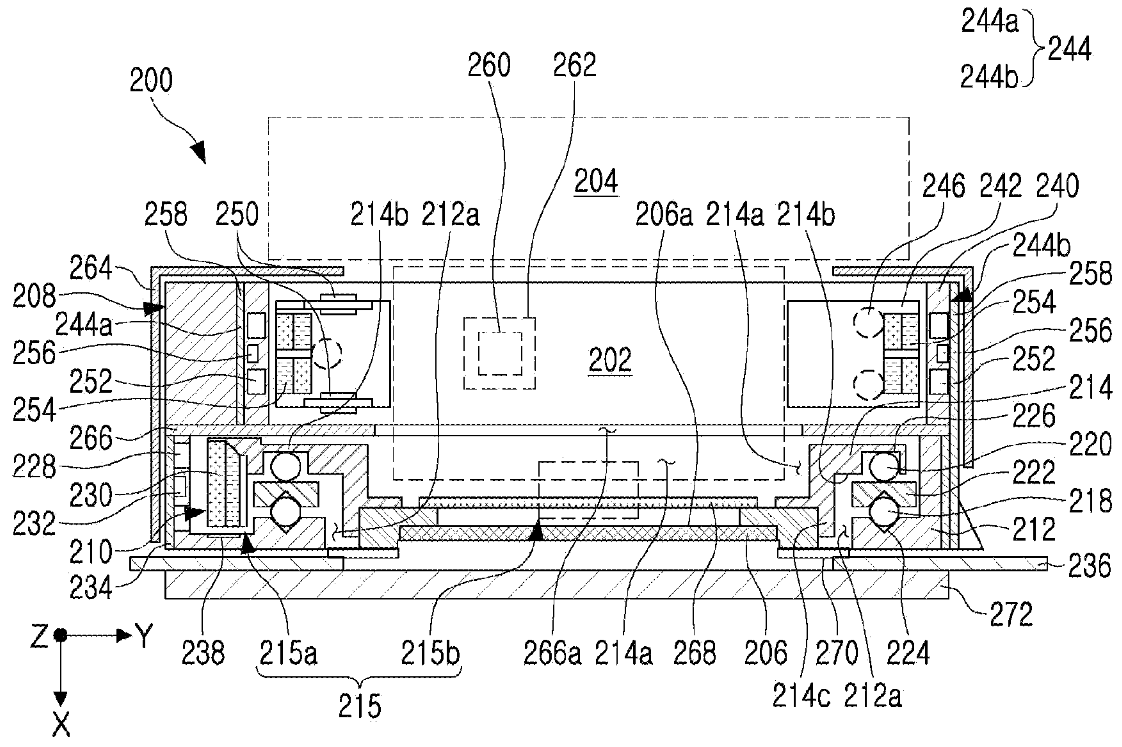
FIG. 2 is a cross-sectional diagram illustrating a camera module, according to an embodiment.
Figure 3:
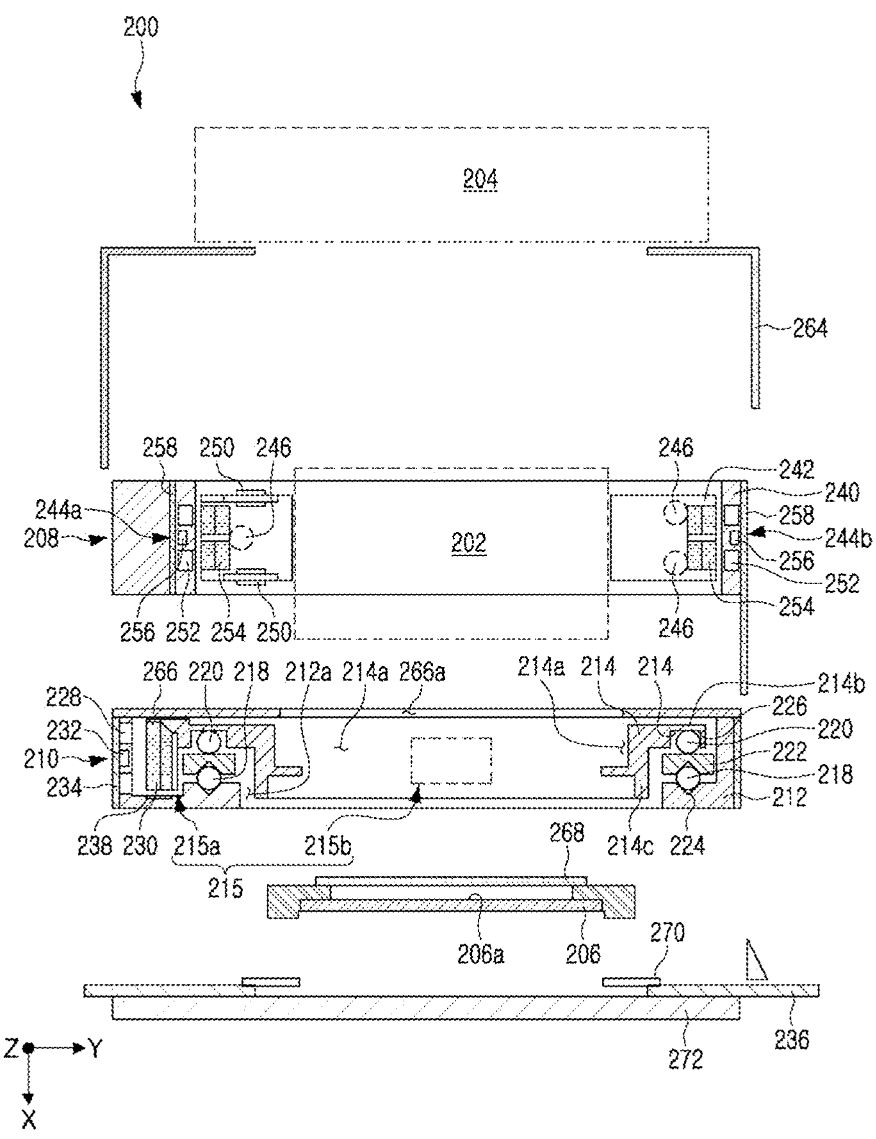
FIG. 3 is an exploded diagram illustrating the camera module illustrated in FIG. 2.

FIG. 2 is a cross-sectional diagram illustrating a camera module 200, according to an embodiment, viewed from the side. In the camera module 200 illustrated in FIG. 2, a reflective member 204, a lens module 202, and an image sensor 206 may be arranged the same as or similar to the manner in which the reflective member 104, the lens module 102, and the image sensor 106 are arranged in the camera module 100 illustrated in FIG. 1. FIG. 3 is an exploded diagram illustrating the camera module 200.

In an embodiment, an OIS driver 210 may include an OIS base 212, an OIS holder 214, and an OIS actuator 215. The image sensor 206 may be fastened to the OIS holder 214, and OIS may be implemented by moving the OIS holder 214 in a direction perpendicular to the optical axis with respect to the OIS base 212.

In an embodiment, the OIS holder 214 may be supported by ball members 218 and 220 in the direction that an imaging plane 206*a* of the image sensor 206 is faces (in a direction parallel to the X-axis). The OIS holder 214 may move in a direction perpendicular to the X-axis while being supported by the ball members 218 and 220 disposed between the OIS holder 214 and the OIS base 212.

In an embodiment, the OIS holder 214 may move in a direction perpendicular to the X-axis (e.g., the Y direction and the Z direction) with respect to the OIS base 212. In an embodiment, the OIS guide 222 may be disposed between the OIS holder 214 and the OIS base 212 to precisely control the movement of the OIS holder 214.

In an embodiment, the OIS guide 222 may be configured to move only in a first direction (e.g., Z direction) perpendicular to the X-axis with respect to the OIS base 212, and to move only in a second direction (e.g., Y direction) perpendicular to the first direction with respect to the OIS holder 214.

In an embodiment, the first ball member 218 may be disposed between the OIS guide 222 and the OIS base 212, and the OIS guide 222 and/or the OIS base 212 may include at least a guide groove 224 configured to accommodate at least a portion of the first ball member 218. The first guide groove 224 disposed in the OIS guide 222 or the OIS base 212 may extend in the Z direction. Since the first ball member 218 moves along the first guide groove 224, the moving direction of the OIS guide 222 with respect to the OIS base 212 may be limited to the direction in which the first guide groove 224 extends (that is, the Z direction).

In an embodiment, the second ball member 220 may be disposed between the OIS holder 214 and the OIS guide 222, and the OIS holder 214 and/or the OIS guide 222 may include a second guide groove 226 configured to accommodate at least a portion of the second ball member 220. The second guide groove 226 disposed in the OIS holder 214 or the OIS guide 222 may extend in the Y direction. Since the second ball member 220 moves along the second guide groove 226, the moving direction of the OIS holder 214 with respect to the OIS guide 222 may be limited to the direction in which the second guide groove 226 extends (Y direction).

In the illustrated embodiment, the first guide groove 224 may extend in the Z direction, and the second guide groove 226 may extend in the Y direction, but the disclosure is not limited to this example. In another embodiment, the directions in which the first guide groove 224 and the second guide groove 226 extend may be changed. That is, the first guide groove 224 may extend in the Y direction, and the second guide groove 226 may extend in the Z direction.

In an embodiment, the OIS actuator 215 may include a voice coil motor. For example, the OIS actuator 215 may include an OIS coil 228 disposed at the OIS base 212, and an OIS magnet 230 disposed at the OIS holder 214 and opposing the OIS coil 228. In an example embodiment, the first coil 228 and the OIS magnet 230 may oppose each other in a direction perpendicular to the optical axis. When a current flows in the OIS coil 228, the OIS holder 214 may move in the Z-axis and/or Y direction with respect to the OIS base 212 by electromagnetic interaction between the OIS coil 228 and the OIS magnet 230.

As another example, the OIS actuator 215 may include an OIS magnet disposed at the OIS base 212, and an OIS coil disposed at the OIS holder 214 and opposing the OIS magnet.

In an embodiment, the OIS actuator 215 may include a first actuator **215*a* and a second actuator 215*b* configured to drive movement in the Y direction and the Z direction, respectively. The first actuator 215*a* and the second actuator 215*b* may include a magnet (e.g., an OIS magnet 230) and a coil (e.g., an OIS coil 228) opposing each other. The magnet may be disposed at the OIS holder 214, the coil may be disposed at the OIS base 212, and the OIS holder 214 may be driven in a direction perpendicular to the optical axis with respect to the OIS base 212 by electromagnetic interaction between the magnet and the coil. In an embodiment, the magnet and the coil included in the OIS actuator 215** may oppose each other in a direction perpendicular to the optical axis (e.g., the Y-axis direction or the Z-axis direction).

The first actuator **215*a* and the second actuator 215*b* may be disposed together on one side of the OIS holder 214 or may be disposed at different sides of the OIS holder 214. For example, the first actuator 215*a* may be disposed at the OIS holder 214 in the −Y direction or the +Y direction with respect to a center of the OIS holder 214, and the second actuator 215*b* may be disposed at the OIS holder 214 in the +Z direction or the −Z direction with respect to the center of the OIS holder 214. As another example, the first actuator 215*a* and the second actuator 215*b* may be disposed at the same side of the OIS holder 214**.

In an embodiment, the first OIS actuator **215*a* may include an OIS magnet 230 and an OIS coil 228 disposed opposite to each other in a direction perpendicular to the optical axis. In the illustrated example embodiment, the OIS magnet 230 and the OIS coil 228 may oppose each other in the Y-axis direction, but the OIS magnet 230 and the OIS coil 228 are not limited to this example. In another embodiment, the OIS magnet 230 and the OIS coil 228** may oppose each other in the Z-axis direction.

In an example embodiment, the second OIS actuator **215*b*** may include an OIS magnet and an OIS coil opposing each other in a direction perpendicular to the optical axis.

In an embodiment, the OIS driver 210 may further include a position sensor 232. The position sensor 232 may be positioned internally or externally of the OIS coil 228, and may be configured to detect the position of the image sensor 206. For example, the position sensor 232 may include a Hall sensor configured to measure a magnetic field of the OIS magnet 230. As another example, the position sensor 232 may include a coil disposed at a position opposite to the OIS magnet 230, and the position of the image sensor 206 may be detected based on changes in inductance of the coil caused by the OIS magnet 230.

In an embodiment, the OIS coil 228 and/or the position sensor 232 may be attached to an OIS substrate 234, which is coupled to the OIS base 212. The OIS substrate 234 may be electrically connected to a connector board 236, and may transmit signals or power necessary for driving the OIS to the connector board 236 or may receive signals or power necessary for driving the OIS from the connector board 236.

In an example embodiment, the OIS base 212 may have a yoke 238 disposed thereon. The yoke 238 may be disposed to oppose the OIS magnet 230, which is disposed at the OIS holder 214, in the X direction. Magnetic attraction formed between the yoke 238 and the OIS magnet 230 may pull the OIS holder 214 toward the OIS base 212 side (the +X direction).

The OIS guide 222 may be supported in the X direction by the first ball member 218, and the OIS holder 214 may be supported in the X direction by the second ball member 220. In an example embodiment, the first ball member 218 may be disposed at each of three or more points between the OIS base 212 and the OIS guide 222, and may stably support the OIS guide 222 in the X direction while OIS is performed. That is, three or more first ball members 218 may be respectively disposed at three or more points between the OIS base 212 and the OIS guide 222. In an embodiment, the second ball member 220 may be disposed at three or more points between the OIS guide 222 and the OIS holder 214 and may stably support the OIS holder 214 in the X direction while OIS is performed. That is, three or more second ball members 220 may be respectively disposed at three or more points between the OIS guide 222 and the OIS holder 214.

In an embodiment, magnetic attraction between the yoke 238 and the OIS magnet 230 may allow the first ball member 218 to be maintained in contact with the OIS base 212 and the OIS guide 222 and may allow the second ball member 220 to be maintained in contact with the OIS holder 214 and the OIS guide 222. That is, the first ball member 218 and the second ball member 220, which are, disposed between the OIS holder 214 and the OIS base 212 may be maintained in contact with the first guide groove 224 and the second guide groove 226, respectively, which may prevent the OIS holder 214 from moving in a direction (the X direction) other than the Y direction or the Z direction when the OIS is driven and may thus contribute to the camera module 200 obtaining an image of excellent quality.

In an example embodiment, the AF driver 208 may include an AF base 240, an AF carrier 242, and an AF actuator 244. The AF carrier 242 may be fastened to the lens module 202. Alternatively, the AF carrier 242 may be integrated with the lens module 202. The AF carrier 242 may be configured to move in the optical axis direction (the X direction) with respect to the AF base 240.

In an example embodiment, a third ball member 246 may be disposed between the AF carrier 242 and the AF base 240. The AF carrier 242 and/or the AF base 240 may include a third guide groove for accommodating at least a portion of the third ball member 246. The third guide groove configured in the AF carrier 242 or the AF base 240 may extend in the X direction. Since the third ball member 246 moves along the third guide groove, the moving direction of the AF carrier 242 with respect to the AF base 240 may be limited to the direction (the X direction) in which the third guide groove extends.

In an embodiment, a damper 250 may be disposed at a front side and a rear side of the AF carrier 242. The damper 250 may be provided to alleviate noise or impact generated by the AF carrier 242 colliding with other structures when the AF carrier 242 moves in the optical axis direction. For example, the damper 250 may be formed of an elastic material such as urethane, rubber, or silicone.

In an embodiment, the AF actuator 244 may include a voice coil motor. The AF actuator 244 may include an AF coil 252 disposed at the AF base 240, and an AF magnet 254 disposed at the AF carrier 242 to oppose the AF coil 252. The AF coil 252 and the AF magnet 254 may oppose each other in a direction perpendicular to the optical axis. Due to electromagnetic interaction between the AF coil 252 and the AF magnet 254 generated when a current flows in the AF coil 252, the AF carrier 242 may move in the optical axis (the X axis) direction with respect to the AF base 240.

In an embodiment, the AF actuator 244 may be disposed at each of both sides of the AF carrier 242. The first AF actuator 244*a* may be disposed at the AF carrier 242 in the −Y direction, and the second AF actuator 244*b* may be disposed at the AF carrier 242 in the +Y direction.

In an embodiment, the AF driver 208 may further include a position sensor 256. The position sensor 256 may be positioned internally or externally of the AF coil 252, and may be configured to detect a position of the lens module 202 on the optical axis. For example, the position sensor 256 may include a Hall sensor configured to measure a magnetic field of the AF magnet 254. As another example, the position sensor 256 may include a coil disposed at a position opposite to the AF magnet 254, and a position of the lens module 202 may be detected using changes in inductance of the coil caused by the AF magnet 254.

In an embodiment, the AF coil 252 and/or the position sensor 256 may be attached to an AF substrate 258, which is coupled to the AF base 240. The AF substrate 258 may be electrically connected to the connector board 236, and may transmit signals or power necessary for driving the AF to the connector board 236 or may receive signals or power necessary for driving the AF from the connector board 236.

In an embodiment, the AF carrier 242 and the AF base 240 may include a magnetic member in portions opposing each other. For example, a first magnetic member 260 may be disposed at a surface of the AF carrier 242 directed in the Z direction, and a second magnetic member 262 opposing the first magnetic member 260 in the Z direction may be disposed at the AF base 240. Magnetic attraction may be formed between the first magnetic member 260 and the second magnetic member 262. For example, the first magnetic member 260 may be implemented by a magnet and the second magnetic member 262 may be implemented by a yoke. As another example, the first magnetic member 260 may be implemented by a yoke and the second magnetic member 262 may be implemented by a magnet. The magnetic attraction formed between the first magnetic member 260 and the second magnetic member 262 may pull the AF carrier 242 toward the AF base 240 side (e.g., in the Z direction).

In an embodiment, the AF magnet 254 may function as the first magnetic member 260. In this case, the second magnetic member 262 may be disposed at the AF base 240 to oppose the AF magnet 254 in the Z direction.

The third ball member 246 disposed between the AF carrier 242 and the AF base 240 may be configured to support the AF carrier 242 in the Z direction. In an embodiment, the third ball member 246 may be disposed at three or more points between the AF carrier 242 and the AF base 240 and may stably support the AF carrier 242 in the Z direction while AF is performed. That is, three or more third ball members 246 may be respectively disposed at three or more points between the AF carrier 242 and the AF base 240.

Magnetic attraction between the first magnetic member 260 and the second magnetic member 262 may allow the third ball member 246 to be maintained in contact with the AF base 240 and the AF carrier 242. That is, the third ball member 246, being disposed between the AF carrier 242 and the AF base 240, may be maintained in contact with the third guide groove, which may prevent the AF carrier 242 from moving in a direction from the X-axis, and may thus contribute to the camera module 200 obtaining an image of excellent quality.

In an embodiment, the AF base 240 may be disposed in a third direction (the −X direction) that the imaging plane 206*a* of the image sensor 206 faces with respect to the OIS base 212. In an embodiment, the OIS base 212, the first and second ball members 218 and 220, and the OIS holder 214 may be stacked in order in the third direction. For example, the first ball member 218 may be seated on the OIS holder (or the first guide groove 224 disposed in the OIS holder) in the third direction, and the OIS guide 222 may be seated on the first ball member 218 in the third direction. The second ball member 220 may be seated on the OIS guide 222 (or the second guide groove 226 disposed in the OIS guide 222) in the third direction, and the OIS holder 214 may be seated on the second ball member 220 in the third direction.

The OIS holder 214 may be pulled in a direction of the OIS base 212 by magnetic attraction between the OIS magnet 230 disposed at the OIS holder 214 and the yoke 238 disposed at the OIS base 212. That is, the OIS holder 214 may be pulled in a direction opposite to the third direction (the +X direction).

In an embodiment, a shield can 264 may seal a portion of the AF driver 208 and the OIS driver 210. The shield can 264 may be configured to prevent an external electromagnetic field from affecting the AF driver 208 or the OIS driver 210, or may prevent an electromagnetic field formed by the AF driver 208 or the OIS driver 210 from affecting an electronic component disposed externally on the shield can 264.

In an embodiment, an OIS cover 266 may be further disposed between the OIS driver 210 and the AF driver 208. The OIS cover 266 may be mounted on the OIS base 212 and disposed on the OIS holder 214 in the −X direction. The OIS cover 266 may prevent the OIS holder 214 from being separated in the −X direction.

In an embodiment, an optical filter 268 may be further disposed on the image sensor 206. The optical filter 268 may include a UV blocking filter. Light passing through the lens module 202 may pass through a UV blocking filter and may reach the image sensor 206.

In an embodiment, the OIS base 212 may be disposed on the connector board 236. Since the image sensor 206 may move with respect to the OIS base 212 depending on the OIS driving, the image sensor 206 may be electrically connected to the connector board 236 through a flexible board 270. The connector board 236 may be fastened to another structure 272.

In an embodiment, the OIS holder 214 may include a receiving portion **214*a* extending in a direction parallel to the optical axis to receive a portion of the lens module 202**.

Referring to FIG. 2, the OIS holder 214 may include a receiving portion **214*a* extending in a direction parallel to the optical axis, and the lens module 202 may be partially inserted to the receiving portion 214*a* of the OIS holder 214. In an embodiment, an edge portion 214*b* of the OIS holder 214 may be disposed on the OIS guide 222 (or the second ball member 220). The OIS holder 214 may include an extension portion 214*c* extending in a direction parallel to the optical axis therein. A portion of the extension portion 214*c* may define the receiving portion 214*a*. The image sensor 206 may be coupled to an end of the extension portion 214*c*. In an embodiment, the extension portion 214*c* may be partially accommodated in a receiving portion 212*a* of the OIS base 212. In an embodiment, the OIS cover 266 may include a receiving portion 266*a* through which the lens module 202** passes.

Figure 4:
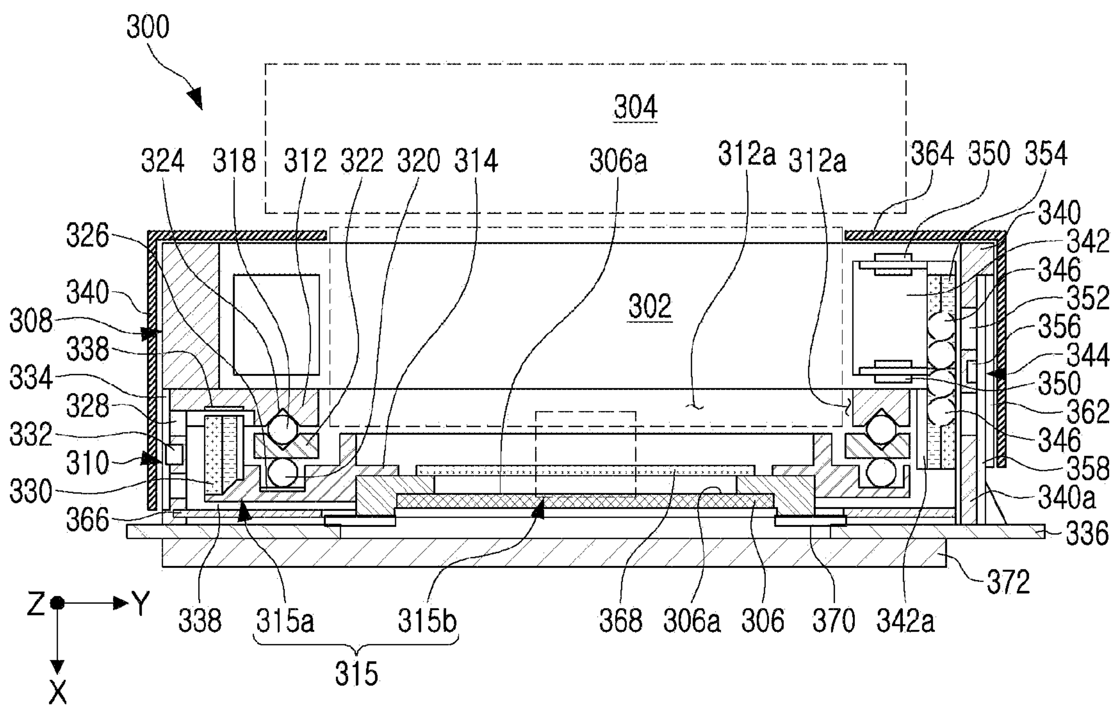
FIG. 4 is a cross-sectional diagram illustrating a camera module, according to an embodiment, viewed from the side.
Figure 5:
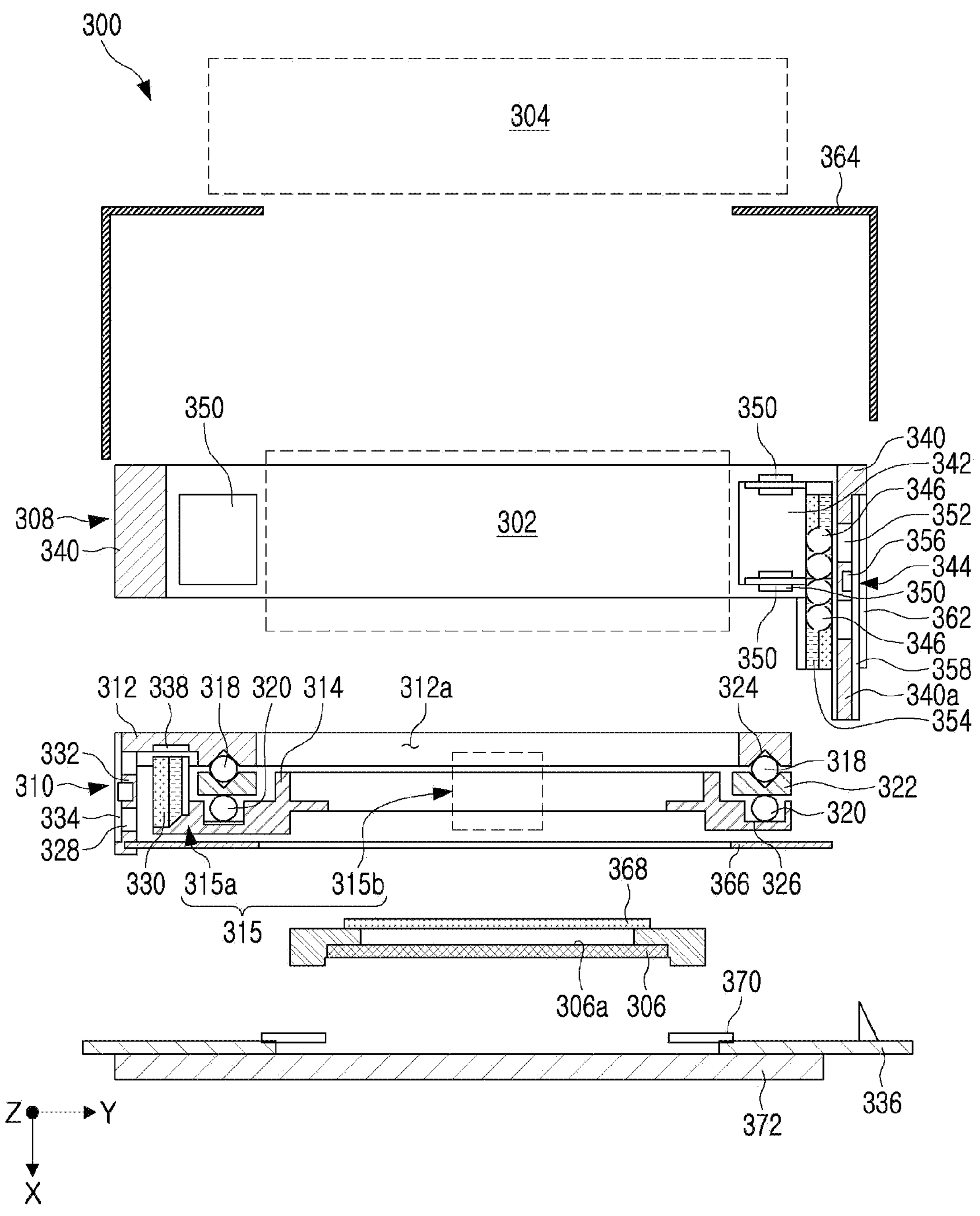
FIG. 5 is an exploded diagram illustrating the camera module illustrated in FIG. 4.

FIG. 4 is a cross-sectional diagram illustrating a camera module 300, according to an embodiment. In the camera module 300 in FIG. 4, a reflective member 304, a lens module 302, and an image sensor 306 may be arranged the same as or similarly to the manner in which the reflective member 104, the lens module 102, and the image sensor 106 are arranged in the camera module 100 illustrated in FIG. 1. FIG. 5 is an exploded diagram illustrating the camera module 300.

Referring to FIG. 4, in an embodiment, an OIS driver 310 may include an OIS base 312, an OIS holder 314, and an OIS actuator 315. The image sensor 306 may be fastened to the OIS holder 314, and OIS may be implemented as the OIS holder 314 moves on a Z-Y plane.

In an embodiment, the OIS holder 314 may be supported by a ball member in a direction that the imaging plane **306*a* of the image sensor 306 faces (in a direction parallel to the X-axis). The OIS holder 314 may move in a direction perpendicular to the X-axis while being supported by the ball members disposed between the OIS holder 314 and the OIS base 312**.

In an embodiment, the OIS holder 314 may move in a direction perpendicular to the X-axis (e.g., the Z direction and the Y direction) with respect to the OIS base 312. An OIS guide 322 may be disposed between the OIS holder 314 and the OIS base 312 to precisely control the movement of the OIS holder 314.

In the embodiment, the OIS holder 314 may move while being pulled to the OIS holder 314 in a direction of an image side. In the embodiment illustrated in FIG. 4, the OIS holder 314 may move while being pulled by the OIS holder 314 in a direction opposite to the image side of the camera module 300.

In an embodiment, the OIS guide 322 may only move in a first direction (e.g., the Z direction) perpendicular to the X-axis with respect to the OIS base 312, and may only move in a second direction (e.g., Y direction) perpendicular to the X-axis and the first direction with respect to the OIS holder 314.

In an embodiment, a first ball member 318 may be disposed between the OIS guide 322 and the OIS base 312, and the OIS guide 322 and/or the OIS base 312 may include a first guide groove 324 configured to accommodate at least a portion of the first ball member 318. The first guide groove 324 disposed in the OIS guide 322 or the OIS base 312 may extend in the Z direction. Since the first ball member 318 moves along the first guide groove 324, the moving direction of the OIS guide 322 with respect to the OIS base 312 may be limited to the direction (Z direction) in which the first guide groove 324 extends.

In an embodiment, a second ball member 320 may be disposed between the OIS holder 314 and the OIS guide 322, and the OIS holder 314 and/or the OIS guide 322 may include a second guide groove 326 configured to accommodate at least a portion of the second ball member 320. The second guide groove 326 disposed in the OIS holder 314 or the OIS guide 322 may extend in the Y direction. Since the second ball member 320 moves along the second guide groove 326, the movement direction of the OIS holder 314 with respect to the OIS guide 322 may be limited to the direction (Y direction) in which the second guide groove 326 extends.

In the illustrated embodiment, the first guide groove 324 may extend in the Z direction, and the second guide groove 326 may extend in the Y direction, but the first and second guide grooves 324 and 326 are not limited to this configuration. In another embodiment, the directions in which the first guide groove 324 and the second guide groove 326 extends may be changed. That is, the first guide groove 324 may extend in the Y direction, and the second guide groove 326 may extend in the Z direction.

In an embodiment, the OIS actuator 315 may include a voice coil motor. In an embodiment, the OIS actuator 315 may include an OIS coil 328 disposed at the OIS base 312, and an OIS magnet 330 disposed at the OIS holder 314 and opposing the OIS coil 328. In an embodiment, the first coil 328 and the OIS magnet 330 may oppose each other in a direction perpendicular to the optical axis. When a current flows in the OIS coil 328, the OIS holder 314 may move in the Z-axis and/or Y direction with respect to the OIS base 312 by electromagnetic interaction between the OIS coil 328 and the OIS magnet 330.

As another example, the OIS actuator 315 may include an OIS magnet disposed at the OIS base 312, and an OIS coil disposed at the OIS holder 314 and opposing the OIS magnet.

In an embodiment, the OIS actuator 315 may include a first OIS actuator 315*a* and a second OIS actuator 315*b* configured to drive movement in the Z direction and the Y direction, respectively. The first OIS actuator 315*a* and the second OIS actuator 315*b* may be disposed together on one side of the OIS holder 314 or may be disposed at different sides of the OIS holder 314. For example, the first OIS actuator 315*a* may be disposed at the OIS holder 314 in the −Y direction or the +Y direction with respect to a center of the OIS holder 314, and the second OIS actuator 315*b* may be disposed at the OIS holder 314 in the +Z direction or the −Z direction with respect to the center of the OIS holder 314. As another example, the first OIS actuator 315*a* and the second OIS actuator 315*b* may be disposed at the same side of the OIS holder 314.

In an example embodiment, the first OIS actuator 315*a* may include an OIS magnet 338 and an OIS coil 328 disposed opposite to each other in a direction perpendicular to the optical axis. In the illustrated embodiment, the OIS magnet 338 and the OIS coil 328 may oppose each other in the Y-axis direction, but is the OIS magnet 338 and the OIS coil 328 are not limited to this configuration. In another embodiment, the OIS magnet 338 and the OIS coil 328 may oppose each other in the Z-axis direction.

In an embodiment, the second OIS actuator 315*b* may include an OIS magnet and an OIS coil opposing each other in a direction perpendicular to the optical axis.

In an embodiment, the OIS driver 310 may further include a position sensor 356. The position sensor 356 may be positioned internally or externally of the OIS coil 328 and may be configured to detect a position of the image sensor 306. For example, the position sensor 356 may include a Hall sensor configured to measure a magnetic field of the OIS magnet 330. As another example, the position sensor 356 may include a coil disposed at a position opposite to the OIS magnet 330, and a position of the image sensor 306 may be detected based on changes in inductance of the coil caused by the OIS magnet 330.

In an embodiment, the OIS coil 328 and/or the position sensor 356 may be attached to a OIS substrate 334 coupled to the OIS base 312. The OIS substrate 334 may be electrically connected to a connector board 336, and may transmit signals or power necessary for driving the OIS to the connector board 336 or may receive signals or power necessary for driving the OIS from the connector board 336.

In an embodiment, the OIS base 312 may have a yoke 338 disposed thereon. The yoke 338 may be disposed to oppose the OIS magnet 330 disposed at the OIS holder 314 in the X direction. The magnetic attraction formed between the yoke 338 and the OIS magnet 330 may pull the OIS holder 314 toward the OIS base 312 (the −X direction).

The OIS guide 322 may be supported in the X direction by the first ball member 318, and the OIS holder 314 may be supported in the X direction by the second ball member 320. In an embodiment, the first ball member 318 may be disposed at each of three or more points between the OIS base 312 and the OIS guide 322, and may stably support the OIS guide 322 in the X direction while OIS is performed. That is, three or more first ball members 318 may be respectively disposed at three or more points between the OIS base 312 and the OIS guide 322. In an embodiment, the second ball member 320 may be disposed at each of three or more points between the OIS guide 322 and the OIS holder 314 and may stably support the OIS holder 314 in the X direction while OIS is performed. That is, three or more second ball members 320 may be respectively disposed at three or more points between the OIS guide 322 and the OIS holder 314.

Magnetic attraction between the yoke 338 and the OIS magnet 330 may allow the first ball member 318 to be maintained in contact with the OIS base 312 and the OIS guide 322, and may allow the second ball member 320 to be maintained in contact with the OIS holder 314 and the OIS guide 322. That is, the first ball member 318 and the second ball member 320, being disposed between the OIS holder 314 and the OIS base 312, may be maintained in contact with the first guide groove 324 and the second guide groove 326, respectively, which may prevent the OIS holder 314 from moving in a direction (X direction) other than the Z direction or the Y direction when the OIS is driven, and may thus contribute to the camera module 300 obtaining an image of excellent quality.

In an embodiment, the AF driver 308 may include an AF base 340, an AF carrier 342, and an AF actuator 344. The AF carrier 342 may be fastened to the lens module 302. The AF carrier 342 may be integrated with the lens module 302. The AF carrier 342 may be configured to move in the optical axis direction (the X direction) with respect to the AF base 340.

In an embodiment, a third ball member 346 may be disposed between the AF carrier 342 and the AF base 340. The AF carrier 342 and/or the AF base 340 may include a third guide groove for accommodating at least a portion of the third ball member 346. The third guide groove configured in the AF carrier 342 or the AF base 340 may extend in the X direction. Since the third ball member 346 moves along the third guide groove, the moving direction of the AF carrier 342 with respect to the AF base 340 may be limited to the direction (X direction) in which the third guide groove extends.

In an embodiment, a damper 350 may be disposed at a front side and a rear side of the AF carrier 342. The damper 350 may be provided to alleviate noise or impact generated by the AF carrier 342 colliding with other structures when the AF carrier 342 moves in the optical axis direction. For example, the damper 350 may be formed of a material having elasticity, such as rubber or silicone.

In an embodiment, the AF actuator 344 may include a voice coil motor. The AF actuator 344 may include an AF coil 352 disposed at the AF base 340, and an AF magnet 354 disposed at the AF carrier 342 to oppose the AF coil 352. The AF coil 352 and the AF magnet 354 may oppose each other in a direction perpendicular to the optical axis. Due to the electromagnetic interaction between the AF coil 352 and the AF magnet 354 formed when a current flows in the AF coil 352, the AF carrier 342 may move in the optical axis (the X axis) direction with respect to the AF base 340.

In an embodiment, the AF driver 308 may be disposed at only one side of the AF carrier 342. The AF carrier 342 may include an extension portion 342*a* extending further in the +X direction than the other portions of the AF carrier 342, and the AF magnet 354 may extend to the extension portion 342*a*. The AF base 340 may also include a portion 340*a* extending further in the optical axis direction than the other portions of the AF base 340 in the portion of the AF base 340 opposing the AF magnet 354. For example, the AF base 340 may extend to the connector board 336.

In an embodiment, the AF driver 308 may further include a position sensor 356. The position sensor 356 may be positioned internally or externally of the AF coil 352, and may be configured to detect a position on the optical axis of the lens module 302. For example, the position sensor 356 may include a Hall sensor configured to measure a magnetic field of the AF magnet 354. As another example, the position sensor 356 may include a coil disposed at a position opposite to the AF magnet 354, and a position of the lens module 302 may be detected based on changes in inductance of the coil caused by the AF magnet 354.

In an embodiment, the AF coil 352 and/or the position sensor 356 may be attached to the AF substrate 358, which is coupled to the AF base 340. The AF substrate 358 may be electrically connected to the connector board 336, and may transmit signals or power necessary for driving the AF to the connector board 336 or may receive signals or power necessary for driving the AF from the connector board 336.

In an embodiment, a yoke 362 may be mounted on a portion of the AF substrate 358 opposing the AF magnet 354 of the AF base 340. Magnetic attraction formed between the AF magnet 354 and the yoke 362 may pull the AF carrier 342 toward the AF base 340 (e.g., the +Y direction).

The third ball member 346, which is disposed between the AF carrier 342 and the AF base 340, may be configured to support the AF carrier 342 in the Y direction. In an example embodiment, the third ball member 346 may be disposed at each of three or more points between the AF carrier 342 and the AF base 340 and may stably support the AF carrier 342 in the Y direction while AF is performed. That is, three or more third ball members 346 may be respectively disposed at three or more points between the AF carrier 342 and the AF base 340.

Magnetic attraction between the AF magnet 354 and the yoke 362 may allow the third ball member 346 to be maintained in contact with the AF base 340 and the AF carrier 342. That is, the third ball member 346, being disposed between the AF carrier 342 and the AF base 340, may be maintained in contact with the third guide groove, which may prevent the AF carrier 342 from moving in a direction different from the X-axis when the AF is driven, and may thus contribute to the camera module 300 obtaining an image of excellent quality.

In an example embodiment, the AF base 340 may be disposed in a third direction (the −X direction) that the imaging plane 306*a* of the image sensor 306 faces with respect to the OIS base 312. In an embodiment, the OIS base 312, the ball members 318 and 220, and the OIS holder 314 may be stacked in order in a fourth direction (+X direction) opposite to the third direction. Specifically, the first ball member 318 may be seated on the OIS holder (or the first guide groove 324 configured in the OIS holder) in the fourth direction, and the OIS guide 322 may be seated on the second ball member 320 in the fourth direction. The second ball member 320 may be seated on the OIS guide 322 (or the second guide groove 326 configured in the OIS guide 322) in the fourth direction, and the OIS holder 314 may be seated on the second ball member 320 in the fourth direction.

The OIS holder 314 may be pulled toward the OIS base 312 by magnetic attraction between the OIS magnet 330 disposed at the OIS holder 314 and the yoke 338 disposed at the OIS base 312. That is, the OIS holder 314 may be pulled in the third direction (the −X direction).

In an embodiment, a shield can 364 may seal a portion of the AF driver 308 and the OIS driver 310. The shield can 364 may be configured to prevent external electromagnetic field from affecting the AF driver 308 or the OIS driver 310, or may prevent an electromagnetic field formed by the AF driver 308 or the OIS driver 310 from affecting an electronic component disposed externally on the shield can 364.

In an embodiment, an OIS cover 366 may be disposed between the OIS driver 310 and the connector board 336. The OIS cover 366 may be mounted on the OIS base 312 and may be disposed on the OIS holder 314 in the +X direction. The OIS cover 366 may prevent the OIS holder 314 from being separated in the +X direction.

In an embodiment, an optical filter 368 may be further disposed on the image sensor 306. The optical filter 368 may include a UV blocking filter. Light passing through the lens module 302 may pass through a UV blocking filter and may reach the image sensor 306.

In an embodiment, the OIS base 312 may be disposed on the connector board 336. Since the image sensor 306 moves with respect to the OIS base 312 according to the OIS driving, the image sensor 306 may be electrically connected to the connector board 336 through a flexible board 370. The connector board 336 may be fastened to another structure 372.

In an example embodiment, the OIS base 312 may include a receiving portion 312*a* extending in a direction parallel to the optical axis to receive a portion of the lens module 302.

Referring to FIG. 2, the OIS base 312 may include a receiving portion 312*a* extending in a direction parallel to the optical axis, and the lens module 302 may be partially inserted to the receiving portion 312*a* of the OIS base 312.

Figure 6:
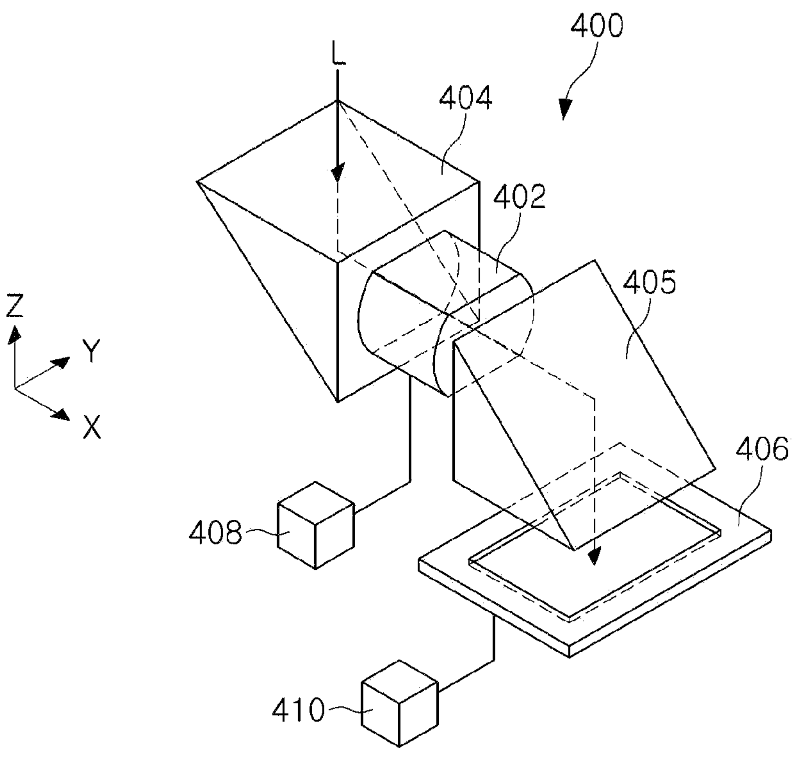
FIG. 6 is a diagram illustrating a camera module, according to an embodiment.

FIG. 6 is a diagram illustrating a camera module 400, according to an embodiment.

Referring to FIG. 6, in an embodiment, the camera module 400 may include a lens module 402, an image sensor 406, a first reflective member 404, and a second reflective member 405. The lens module 402 may include at least one lens. The lens module 402 may include a lens barrel configured to accommodate the lens. In an example in which the lens module 402 includes several lenses, the lenses may be sequentially arranged in one direction, and the direction in which the lenses are sequentially arranged may be defined as an optical axis of the lens module 402. For example, the lenses may be sequentially arranged in a direction parallel to the X-axis.

The reflective member 404 may reflect light incident in one direction to travel in another direction. The reflective member 404 may include, for example, a prism or a mirror. The first reflective member 404 may reflect light incident on one surface to the lens module 402, and the second reflective member 405 may reflect light passing through the lens module 402 to travel back toward the image sensor 406. For example, the first reflective member 404 may change light incident in the −Z direction to travel the +X direction, and the second reflective member 405 may change light to travel in the −Z direction.

In an embodiment, the camera module 400 may have an autofocusing (AF) function. To perform the AF function, the lens module 402 may move in a direction parallel to the optical axis with respect to the image sensor 406, and accordingly, the focal length may be adjusted. The camera module 400 may include an AF driver 408 for moving the lens module 402. The AF driver 408 may include, for example, structures configured to guide the movement of the lens module 402, and an actuator configured to move the lens module 402. Example components included in the AF driver 408 will be described with reference to FIGS. 7 and 8. Additionally or alternatively, an AF function may be implemented by movement of the image sensor 406. The image sensor 406 may move in the Z direction to perform the AF function.

In an embodiment, the camera module 400 may have an optical image stabilization (OIS) function. An OIS function may be implemented by shifting the lens module 402 or the image sensor 406 in a direction perpendicular to the traveling direction of light. For example, the image sensor 406 may be shifted on the X-Y plane. The camera module 400 may include an OIS driver 410 for optical image stabilization. The OIS driver 410 may be configured to move the image sensor 406 in the X direction and/or the Y direction. The OIS driver 410 will be described in greater detail with reference to FIGS. 7 and 8.

Figure 7:
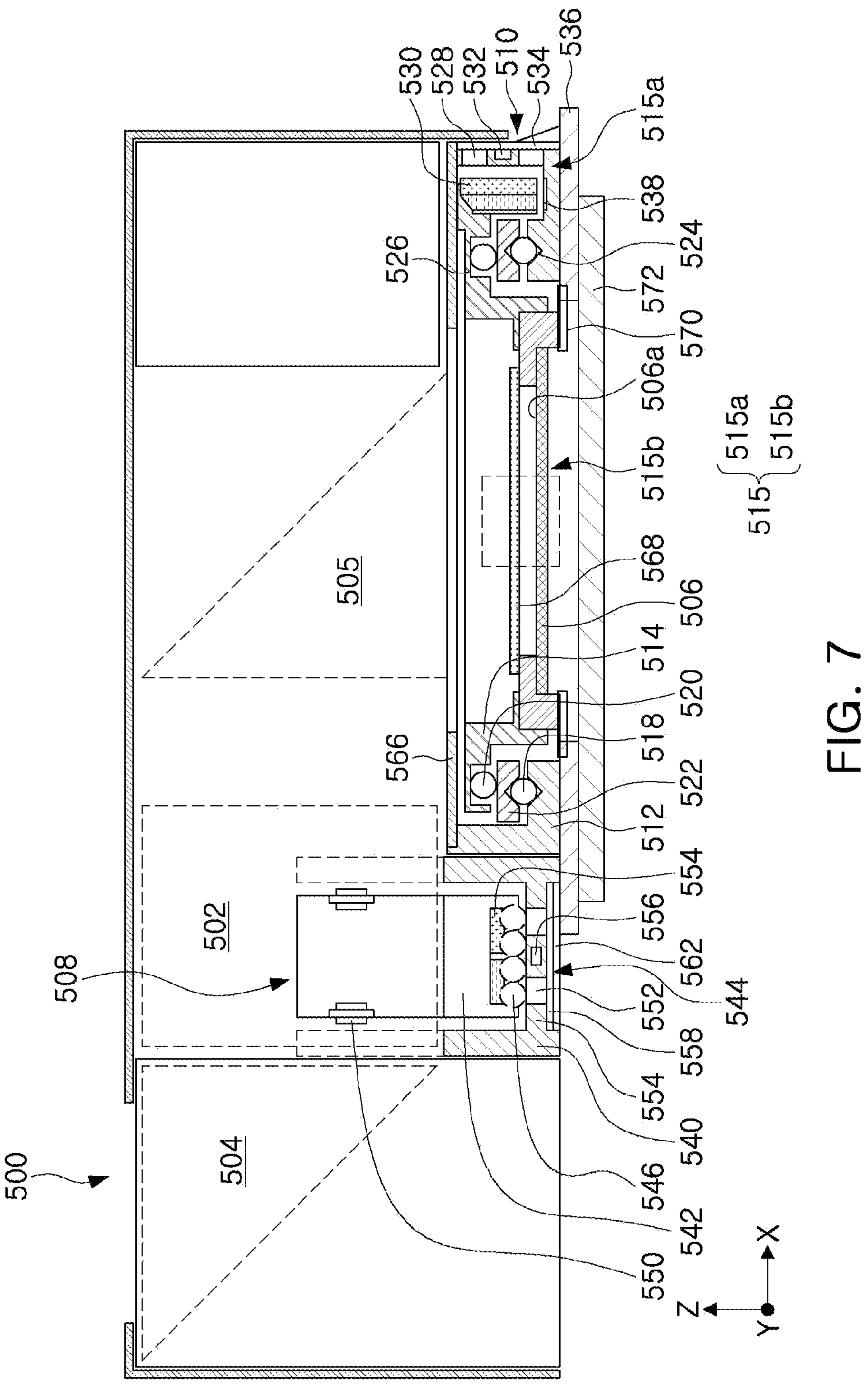
FIG. 7 is a cross-sectional diagram illustrating a camera module, according to an embodiment, viewed from the side.

FIG. 7 is a cross-sectional diagram illustrating a camera module 500, according to an embodiment, viewed from the side. In the camera module 500 in FIG. 7, a first reflective member 504, a second reflective member 505, a lens module 502, and an image sensor 506 may be arranged the same as or similarly to the manner in which the first reflective member 404, the second reflective member 405, the lens module 402, and the image sensor 406 are arranged in the camera module 400 illustrated in FIG. 6.

In an embodiment, the OIS driver 510 may include an OIS base 512, an OIS holder 514, and an OIS actuator 515. The image sensor 506 may be fastened to the OIS holder 514, and OIS may be implemented by moving the OIS holder 514 on the X-Y plane. The OIS driver 510 illustrated in FIG. 7 may be similar to the example embodiment in FIG. 2, but, alternatively, the camera module 500 may include an OIS driver 510 similar to the OIS driver 410 in the embodiment in FIG. 4.

In an embodiment, the OIS holder 514 may be supported by a ball member in a direction that the imaging plane 506*a* of the image sensor 506 faces (in a direction parallel to the Z-axis). The OIS holder 514 may move in a direction perpendicular to the Z-axis while being supported by ball members disposed between the OIS holder 514 and the OIS base 512.

In an embodiment, the OIS holder 514 may move in a direction perpendicular to the Z-axis (e.g., the Y direction and the X direction) with respect to the OIS base 512. An OIS guide 522 may be disposed between the OIS holder 514 and the OIS base 512 to precisely control the movement of the OIS holder 514.

In an embodiment, the OIS guide 522 may move only in the first direction (e.g., Y direction) perpendicular to the Z-axis with respect to the OIS base 512, and may move only in the second direction (e.g., X direction) perpendicular to the first direction with respect to the OIS holder 514.

In an embodiment, a first ball member 518 may be disposed between the OIS guide 522 and the OIS base 512, and the OIS guide 522 and/or the OIS base 512 may include a first guide groove 524 configured to accommodate at least a portion of the first ball member 518. The first guide groove 524 disposed in the OIS guide 522 or the OIS base 512 may extend in the Y direction. Since the first ball member 518 moves along the first guide groove 524, the moving direction of the OIS guide 522 with respect to the OIS base 512 may be limited to the direction in which the first guide groove 524 extends (Y direction).

In an embodiment, a second ball member 520 may be disposed between the OIS holder 514 and the OIS guide 522, and the OIS holder 514 and/or the OIS guide 522 may include a second guide groove 526 configured to accommodate at least a portion of the second ball member 520. The second guide groove 526 disposed in the OIS holder 514 or the OIS guide 522 may extend in the Y direction. Since the second ball member 520 moves along the second guide groove 526, the movement direction of the OIS holder 514 with respect to the OIS guide 522 may be limited to the direction (Y direction) in which the second guide groove 526 extends.

In the illustrated embodiment, the first guide groove 524 may extend in the Y direction, and the second guide groove 526 may extend in the X direction, but the first and second guide grooves 524 and 526 are not limited to this configuration. In another embodiment, the directions in which the first guide groove 524 and the second guide groove 526 extends may be changed. That is, the first guide groove 524 may extend in the X direction, and the second guide groove 526 may extend in the Y direction.

In an embodiment, the OIS actuator 515 may include a voice coil motor. An OIS coil 528 may be disposed at the OIS base 512, and an OIS magnet 530 opposing the OIS coil 528 may be disposed at the OIS holder 514. When a current flows in the OIS coil 528, the OIS holder 514 may move in the X-axis and/or Y direction with respect to the OIS base 512 by electromagnetic interaction between the OIS coil 528 and the OIS magnet 530. As another example, the OIS actuator 515 may include an OIS magnet disposed at the OIS base 512, and an OIS coil disposed at the OIS holder 514 and opposing the OIS magnet.

In an embodiment, the OIS actuator 515 may include a first OIS actuator 515*a* and a second OIS actuator 515*b* configured to drive movement in the X direction and the Y direction, respectively. The first OIS actuator 515*a* and the second OIS actuator 515*b* may be disposed together on one side of the OIS holder 514 or may be disposed at different sides of the OIS holder 514. For example, the first OIS actuator 515*a* may be disposed at the OIS holder 514 in the −X direction or the +X direction with respect to a center of the OIS holder 514, and the second OIS actuator 515*b* may be disposed at the OIS holder 514 in the +Y direction or the −Y direction with respect to the center of OIS holder 514. As another example, the first OIS actuator 515*a* and the second OIS actuator 515*b* may be disposed at the OIS holder 514 in the −X direction or the +X direction with respect to the center of the OIS holder 514.

In an example embodiment, the OIS driver 510 may further include a position sensor 556. The position sensor 556 may be positioned internally or externally of the OIS coil 528, and may be provided to detect the position of the image sensor 506. For example, the position sensor 556 may include a Hall sensor configured to measure the magnetic field of the OIS magnet 530. As another example, the position sensor 556 may include a coil disposed at a position opposite to the OIS magnet 530, and a position of the image sensor 506 may be detected using changes in inductance of the coil caused by the OIS magnet 530.

In an embodiment, the OIS coil 528 and/or the position sensor 556 may be attached to an OIS substrate 534 coupled to the OIS base 512. The OIS substrate 534 may be electrically connected to a connector board 536, and may transmit signals or power necessary for driving the OIS to the connector board 536 or may receive signals or power necessary for driving the OIS from the connector board 536.

In an embodiment, the OIS base 512 may have a yoke 538 disposed thereon. The yoke 538 may be disposed to oppose the OIS magnet 530 disposed at the OIS holder 514 in the Z direction. The magnetic attraction formed between the yoke 538 and the OIS magnet 530 may pull the OIS holder 514 toward the OIS base 512 (−Z direction).

The OIS guide 522 may be supported in the Z direction by the first ball member 518, and the OIS holder 514 may be supported in the Z direction by the second ball member 520. In an embodiment, the first ball member 518 may be disposed at each of three or more points between the OIS base 512 and the OIS guide 522, and may stably support the OIS guide 522 in the Z direction while OIS is performed. That is, three or more first ball members 518 may be respectively disposed at three or more points between the OIS base 512 and the OIS guide 522.

In an embodiment, the second ball member 520 may be disposed at each of three or more points between the OIS guide 522 and the OIS holder 514 and may stably support the OIS holder 514 in the Z direction while OIS is performed. That is, three or more second ball members 520 may be respectively disposed at three or more points between the OIS guide 522 and the OIS holder 514.

Magnetic attraction between the yoke 538 and the OIS magnet 530 may allow the first ball member 518 to be maintained in contact with the OIS base 512 and the OIS guide 522, and may allow the second ball member 520 to be maintained in contact with the OIS holder 514 and the OIS guide 522. That is, the first ball member 518 and the second ball member 520 disposed between the OIS holder 514 and the OIS base 512 may be maintained in contact with the first guide groove 524 and the second guide groove 526, respectively, which may prevent the OIS holder 514 from moving in a direction (X direction) other than the Z direction or the Y direction when the OIS is driven, and may thus contribute to the camera module 500 obtaining an image of excellent quality.

In an embodiment, the AF driver 508 may include an AF base 540, an AF carrier 542, and an AF actuator 544. The AF carrier 542 may be fastened to the lens module 502. Alternatively, the AF carrier 542 may be integrated with the lens module 502. The AF carrier 542 may be configured to move in the optical axis direction (the X direction) with respect to the AF base 540.

In an embodiment, a third ball member 546 may be disposed between the AF carrier 542 and the AF base 540. The AF carrier 542 and/or the AF base 540 may include a third guide groove configured to accommodate at least a portion of the third ball member 546. The third guide groove disposed in the AF carrier 542 or the AF base 540 may extend in the X direction. Since the third ball member 546 moves along the third guide groove, the moving direction of the AF carrier 542 with respect to the AF base 540 may be limited to the direction (X direction) in which the third guide groove extends.

In an embodiment, a damper 550 may be disposed at a front side and a rear side of the AF carrier 542. The damper 550 may be provided to alleviate noise or impact generated by the AF carrier 542 colliding with other structures when the AF carrier 542 moves in the optical axis direction. For example, the damper 550 may be formed of a material having elasticity, such as rubber or silicone.

In an embodiment, the AF actuator 544 may include a voice coil motor. The AF actuator 544 may include an AF coil 552 disposed at the AF base 540, and an AF magnet 554 disposed at the AF carrier 542 opposite to the AF coil 552. The AF coil 552 and the AF magnet 554 may oppose each other in a direction perpendicular to the optical axis. Due to the electromagnetic interaction between the AF coil 552 and the AF magnet 554 formed when a current flows through the AF coil 552, the AF carrier 542 may move in the optical axis (the X axis) direction with respect to the AF base 540.

In an embodiment, the AF driver 508 may further include a position sensor 556. The position sensor 556 may be positioned internally or externally of the AF coil 552, and may be configured to detect a position of the lens module 502 on the optical axis. For example, the position sensor 556 may include a Hall sensor configured to measure a magnetic field of the AF magnet 554. As another example, the position sensor 556 may include a coil disposed at a position opposite to the AF magnet 554, and a position of the lens module 502 may be detected based on changes in inductance of the coil caused by the AF magnet 554.

In an embodiment, the AF coil 552 and/or the position sensor 556 may be attached to an AF substrate 558 coupled to the AF base 540. The AF substrate 558 may be electrically connected to the connector board 536, and may transmit signals or power necessary for driving the AF to the connector board 536 or may receive signals or power necessary for driving the AF from the connector board 536.

In an example embodiment, a yoke 562 may be mounted on a portion of the AF carrier 542 opposing the AF magnet 554 of the AF base 540. Magnetic attraction formed between the AF magnet 554 and the yoke 562 may pull the AF carrier 542 toward the AF base 540 (e.g., −Z direction).

The third ball member 546 disposed between the AF carrier 542 and the AF base 540 may be configured to support the AF carrier 542 in the Z direction. In an embodiment, the third ball member 546 may be disposed at each of three or more points between the AF carrier 542 and the AF base 540 and may stably support the AF carrier 542 in the Z direction while AF is performed. That is, three or more third ball members 546 may be respectively disposed at three or more points between the AF carrier 542 and the AF base 540.

Magnetic attraction between the AF magnet 554 and the yoke 562 may allow the third ball member 546 to be maintained in contact with the AF base 540 and the AF carrier 542. That is, the third ball member 546, being disposed between the AF carrier 542 and the AF base 540, may be maintained in contact with the third guide groove, which may prevent the AF carrier 542 from moving in a direction other than the X direction when the AF is driven and may thus contribute to the camera module 500 obtaining an image of excellent quality.

In an embodiment, the second reflective member 505 may be disposed in the third direction (+Z direction) toward the imaging plane 506*a* of the image sensor 506 with respect to the OIS base 512. In an embodiment, the OIS base 512, the first and second ball members 518 and 220, and the OIS holder 514 may be stacked in order in the third direction. For example, the first ball member 518 may be seated on the OIS holder 514 (or the first guide groove 524 disposed in the OIS holder 514) in the third direction, and the OIS guide 522 may be seated on the first ball member 518 in the third direction. The second ball member 520 may be seated on the OIS guide 522 (or the second guide groove 526 configured in the OIS guide 522) in the third direction, and the OIS holder 514 may be seated on the second ball member 520 in the third direction.

The OIS holder 514 may be pulled toward the OIS base 512 by magnetic attraction between the OIS magnet 530 disposed at the OIS holder 514 and the yoke 538 disposed at the OIS base 512. That is, the OIS holder 514 may be pulled in a direction opposite to the third direction (−Z direction).

In an embodiment, an OIS cover 566 may be further disposed at the OIS driver 510. The OIS cover 566 may be mounted on the OIS base 512 and may be disposed on the OIS holder 514 in the +Z direction. The OIS cover 566 may prevent the OIS holder 514 from being separated in the +Z direction.

In an embodiment, an optical filter 568 may be further disposed on the image sensor 506. The optical filter 568 may include a UV blocking filter. The light passing through the lens module 502 may pass through a UV blocking filter and may reach the image sensor 506.

In an embodiment, the OIS base 512 may be disposed on the connector board 536. Since the image sensor 506 moves with respect to the OIS base 512 according to the OIS driving, the image sensor 506 may be electrically connected to the connector board 536 through a flexible board 570. The connector board 536 may be fastened to another structure 572.

Figure 8:
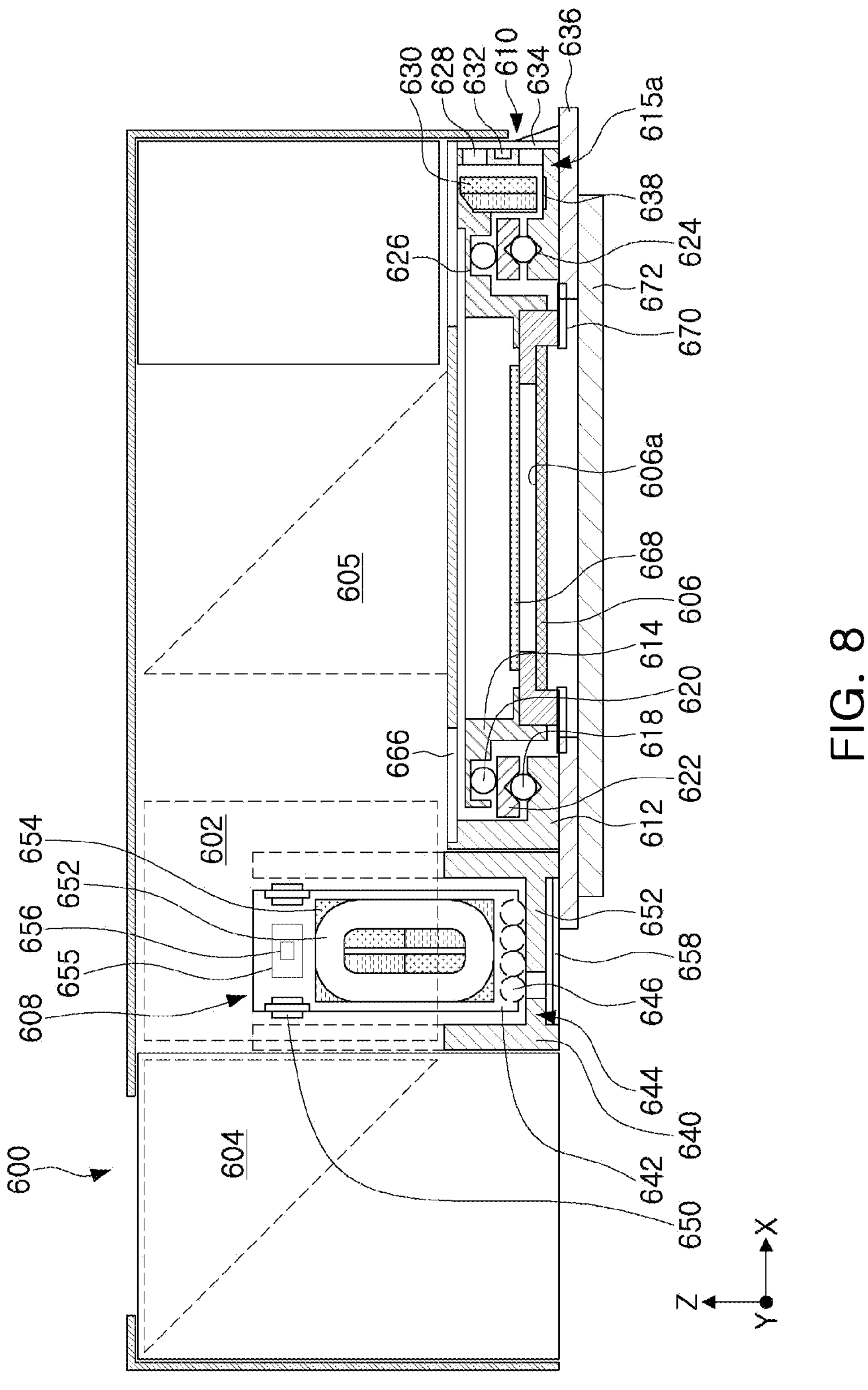
FIG. 8 is a cross-sectional diagram illustrating a camera module, according to an embodiment.

FIG. 8 is a cross-sectional diagram illustrating a camera module 600, according to an embodiment. In the camera module 600 in FIG. 8, a first reflective member 604, a second reflective member 605, a lens module 602, and an image sensor 606 may be arranged the same as or similarly to the manner in which the first reflective member 504, the second reflective member 505, the lens module 502, and the image sensor 506 are arranged in the camera module 400 illustrated in FIG. 6.

In an embodiment, an OIS driver 610 may include an OIS base 612, an OIS holder 614, and an OIS actuator 615*a*. The image sensor 606 may be fastened to the OIS holder 614, and OIS may be implemented as the OIS holder 614 moves on the X-Y plane.

In an embodiment, the OIS driver 610 may be substantially the same as the OIS driver 510 in the embodiment in FIG. 7, and overlapping descriptions will not be provided. Alternatively, the OIS driver 610 may be similar to the OIS driver 410 in the embodiment in FIG. 4.

In an embodiment, the AF driver 608 may include an AF base 640, an AF carrier 642, and an AF actuator 644. The AF carrier 642 may be fastened to the lens module 602. Alternatively, the AF carrier 642 may be integrated with the lens module 602. The AF carrier 642 may be configured to move in the optical axis direction (the X direction) with respect to the AF base 640.

In an example embodiment, a third ball member 646 may be disposed between the AF carrier 642 and the AF base 640. The AF carrier 642 and/or the AF base 640 may include a third guide groove configured to accommodate at least a portion of the third ball member 646. The third guide groove disposed in the AF carrier 642 or the AF base 640 may extend in the X direction. Since the third ball member 646 moves along the third guide groove, the moving direction of the AF carrier 642 with respect to the AF base 640 may be limited to the direction (X direction) in which the third guide groove extends.

In an embodiment, a damper 650 may be disposed at a front side and a rear side of the AF carrier 642. The damper 650 may be configured to alleviate noise or impact generated by the AF carrier 642 colliding with other structures when the AF carrier 642 moves in the optical axis direction. For example, the damper 650 may be formed of a material having elasticity, such as rubber or silicone.

In an embodiment, the AF actuator 644 may include a voice coil motor. The AF actuator 644 may include an AF coil 652 disposed at the AF base 640, and an AF magnet 654 disposed at the AF carrier 642 to oppose the AF coil 652. The AF coil 652 and the AF magnet 654 may oppose each other in a direction perpendicular to the optical axis. Due to electromagnetic interaction between the AF coil 652 and the AF magnet 654 formed when a current flows through the AF coil 652, the AF carrier 642 may move in the optical axis (the X axis) direction with respect to the AF base 640.

The AF magnet 654 may be disposed at the AF carrier 642 in the −Y direction and/or the +Y direction. Also, the AF coil 652 may be disposed at the AF base 640 to oppose the AF magnet 654 in the Y direction. The embodiment in FIG. 8 may differ from the example embodiment in FIG. 7 in that the AF driver 608 is disposed at the AF carrier 642 in the −Y direction rather than the −Z direction.

In an embodiment, the AF driver 608 may further include a position sensor 656. The position sensor 656 may be positioned internally or externally of the AF coil 652, and may be provided to detect a position of the lens module 602 on the optical axis. For example, the position sensor 656 may include a Hall sensor configured to measure a magnetic field of the AF magnet 654. As another example, the position sensor 656 may include a coil disposed at a position opposite to the AF magnet 654, and the position of a lens module 602 may be detected based on changes in inductance of the coil caused by the AF magnet 654.

In an embodiment, the AF driver 608 may further include a sensor magnet 655 for the position sensor 656. The sensor magnet 655 may be separated from the AF magnet 654 and may be disposed at the AF carrier 642, and the position sensor 656 may be disposed at the AF base 640 to oppose the sensor magnet 655.

In an embodiment, the AF coil 652 and/or the position sensor 656 may be attached to an AF substrate 658 coupled to the AF base 640. The AF substrate 658 may be electrically connected to the connector board 636, and may transmit signals or power necessary for driving the AF to the connector board 636 or may receive signals or power necessary for driving the AF from the connector board 636.

In an embodiment, a yoke may be mounted on a portion opposing the AF magnet 654 of the AF base 640. Magnetic attraction formed between the AF magnet 654 and the yoke may pull the AF carrier 642 toward the AF base 640 (e.g., −Z direction). Alternatively or additionally, a first magnetic member separate from the AF magnet 654 may be disposed at the AF carrier 642, and the second magnetic member may be disposed on the AF base 640 to oppose the first magnetic member in the Z direction. The first magnetic member and the second magnetic member may be configured such that attractive force may act therebetween. For example, the first magnetic member may be a magnet, and the second magnetic member may be a yoke.

A third ball member 646 may be disposed between the AF carrier 642 and the AF base 640 to support the AF carrier 642 in the Z direction. In an embodiment, the third ball member 646 may be disposed at each of three or more points between the AF carrier 642 and the AF base 640 and may stably support the AF carrier 642 in the Z direction while AF is performed. That is, three or more third ball members 646 may be respectively disposed at three or more points between the AF carrier 642.

Magnetic attraction between the AF magnet 654 and the yoke may allow the third ball member 646 to be maintained in contact with the AF base 640 and the AF carrier 642. That is, the third ball member 646 disposed between the AF carrier 642 and the AF base 640 may be maintained in contact with the third guide groove, which may prevent the AF carrier 642 from moving in a direction other than the X direction when the AF is driven and may thus contribute to the camera module 600 obtaining an image of excellent quality.

In an embodiment, the second reflective member 605 may be disposed in the third direction (the +Z direction) toward an imaging plane 606*a* of the image sensor 606 with respect to the OIS base 612. In an embodiment, the OIS base 612, the first and second ball members 618 and 220, and the OIS holder 614 may be stacked in order in the third direction. Specifically, the first ball member 618 may be seated on the OIS holder (or the first guide groove 624 disposed in the OIS holder) in the third direction, and the OIS guide 622 may be seated on the first guide groove 624 in the third direction. The second ball member 620 may be seated on the OIS guide 622 (or the second guide groove 626 disposed in the OIS guide 622) in the third direction, and the OIS holder 614 may be seated on the second ball member 620 in the third direction.

The OIS holder 614 may be pulled toward the OIS base 612 by magnetic attraction between the OIS magnet 630 disposed at the OIS holder 614 and the yoke 638 disposed at the OIS base 612. That is, the OIS holder 614 may be pulled in a direction opposite to the third direction (−Z direction).

In an embodiment, an OIS cover 666 may be further disposed at the OIS driver 610. The OIS cover 666 may be mounted on the OIS base 612 and may be disposed on the OIS holder 614 in the +Z direction. The OIS cover 666 may prevent the OIS holder 614 from being separated in the +Z direction.

In an embodiment, an optical filter 668 may be further disposed on the image sensor 606. The optical filter 668 may include a UV blocking filter. Light passing through the lens module 602 may pass through a UV blocking filter and may reach the image sensor 606.

In an embodiment, the OIS base 612 may be disposed on the connector board 636. Since the image sensor 606 moves with respect to the OIS base 612 according to the OIS driving, the image sensor 606 may be electrically connected to the connector board 636 through a flexible board 670. The connector board 636 may be fastened to another structure 672.

Figure 9:
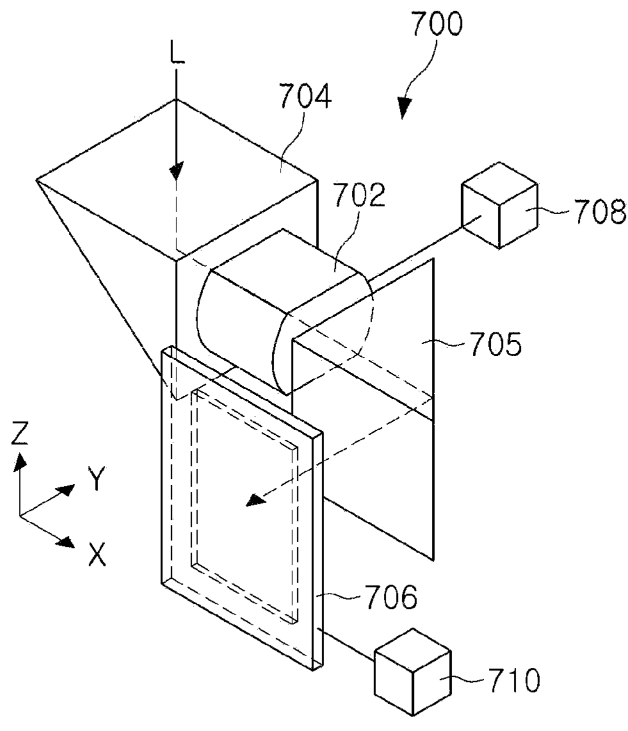
FIG. 9 is a diagram illustrating a camera module, according to an embodiment.

FIG. 9 is a diagram illustrating a camera module 700, according to an embodiment.

In an embodiment, the camera module 700 may include a lens module 702, an image sensor 706, a first reflective member 704, and a second reflective member 705. The lens module 702 may include at least one lens. The lens module 702 may include a lens barrel configured to accommodate the lens. In an example in which the lens module 702 includes several lenses, the lenses may be sequentially arranged in one direction, and in this case, the direction in which the lenses are sequentially arranged may be defined as an optical axis of the lens module 702. For example, the lenses may be sequentially arranged in a direction parallel to the X-axis.

The reflective member 704 may reflect light incident in one direction to travel in another direction. The reflective member 704 may include, for example, a prism or a mirror. The first reflective member 704 may reflect light incident to one surface to the lens module 702, and the second reflective member 705 may reflect light passing through the lens module 702 to travel back toward the image sensor 706. For example, the first reflective member 704 may change light incident in the −Z direction to travel in the +X direction, and the second reflective member 705 may change light to travel in the −Y direction.

In an embodiment, the camera module 700 may provide an autofocusing (AF) function. The lens module 702 may move in a direction parallel to the optical axis with respect to the image sensor 706, and accordingly, a focal length may be adjusted. The camera module 700 may include an AF driver 708 configured to move the lens module 702. The AF driver 708 may include, for example, structures configured to guide the movement of the lens module 702, and an actuator configured to move the lens module 702. Example components included in the AF driver 708 will be described in greater detail with reference to FIG. 10. Additionally or alternatively, the AF function may be implemented by movement of the image sensor 706. The image sensor 706 may move in the Z direction to perform the AF function.

In an embodiment, the camera module 700 may have an optical image stabilization (OIS) function. An OIS function may be implemented by shifting the lens module 702 or the image sensor 706 in a direction perpendicular to the traveling direction of light. For example, the image sensor 706 may be shifted on the X-Y plane. The camera module 700 may include an OIS driver 710 for optical image stabilization. The OIS driver 710 may be configured to move the image sensor 706 in the X direction and/or the Y direction. The OIS driver 710 will be described in greater detail with reference to FIG. 10.

Figure 10:
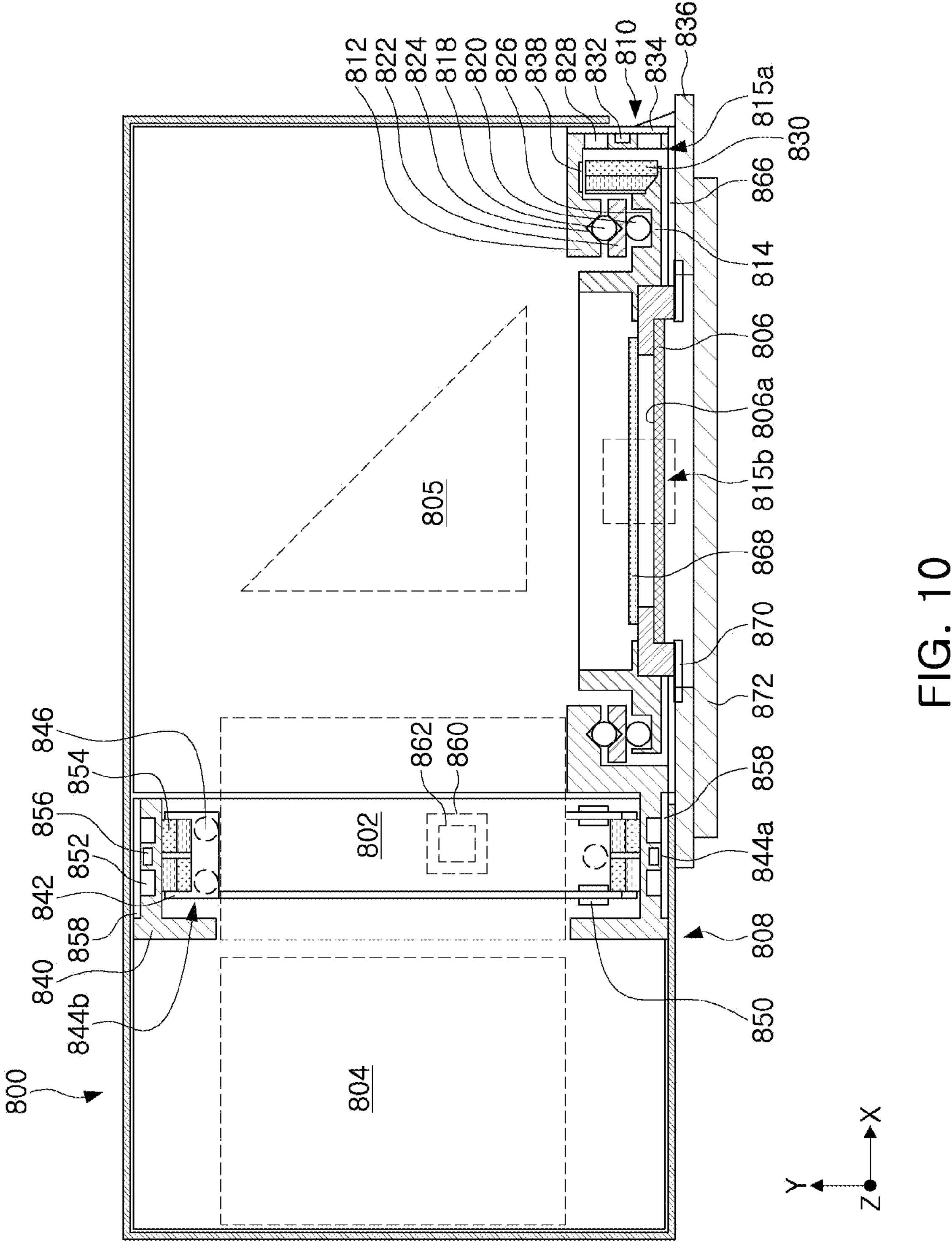
FIG. 10 is a cross-sectional diagram illustrating a camera module, according to an embodiment of the present disclosure, viewed in the Z direction.

FIG. 10 is a cross-sectional diagram illustrating a camera module 800, according to an embodiment. In the camera module 800 in FIG. 2, a first reflective member 804, a second reflective member 805, a lens module 802, and an image sensor 806 may be arranged the same as or similarly to the manner in which the first reflective member 704, the second reflective member 705, the lens module 702, and the image sensor 706 are arranged in the camera module 700 illustrated in FIG. 9.

Referring to FIG. 10, in an embodiment, an OIS driver 810 may include an OIS base 812, an OIS holder 814, and an OIS actuator 815. The image sensor 806 may be fastened to the OIS holder 814, and OIS may be implemented as the OIS holder 814 moves on the X-Z plane.

In an embodiment, the OIS holder 814 may be supported by a ball member in a direction that the imaging plane 806*a* of the image sensor 806 faces (in a direction parallel to the Y-axis). The OIS holder 814 may move in a direction perpendicular to the Y-axis while being supported by the ball members disposed between the OIS holder 814 and the OIS base 812.

In an embodiment, the OIS holder 814 may move in a direction perpendicular to the Y-axis (e.g., the Z direction and the X direction) with respect to the OIS base 812. An OIS guide 822 may be disposed between the OIS holder 814 and the OIS base 812 to accurately control the movement of the OIS holder 814.

In an embodiment, the OIS guide 822 may move only in the first direction (e.g., Z direction) perpendicular to the Y axis with respect to the OIS base 812, and move only in the second direction (e.g., Y direction) perpendicular to the Y-axis and the first direction with respect to the OIS holder 814.

In an embodiment, a first ball member 818 may be disposed between the OIS guide 822 and the OIS base 812, and the OIS guide 822 and/or the OIS base 812 may include a first guide groove 824 configured to accommodate at least a portion of the first ball member 818. The first guide groove 824 disposed in the OIS guide 822 or the OIS base 812 may extend in the Z direction. Since the first ball member 818 moves along the first guide groove 824, the moving direction of the OIS guide 822 with respect to the OIS base 812 may be limited to the direction (Z direction) in which the first guide groove 824 extends.

In an embodiment, the second ball member 820 may be disposed between the OIS holder 814 and the OIS guide 822, and the OIS holder 814 and/or the OIS guide 822 may include a second guide groove 826 configured to accommodate at least a portion of the second ball member 820. The second guide groove 826 disposed in the OIS holder 814 or the OIS guide 822 may extend in the X direction. Since the second ball member 820 moves along the second guide groove 826, the moving direction of the OIS holder 814 with respect to the OIS guide 822 may be limited to the direction (X direction) in which the second guide groove 826 extends.

In the illustrated embodiment, the first guide groove 824 may extend in the Z direction, and the second guide groove 826 may extend in the X direction, but is the first and second guide grooves 824 and 826 are not limited thereto. In another embodiment, the directions in which the first guide groove 824 and the second guide groove 826 extends may be changed. That is, the first guide groove 824 may extend in the X direction, and the second guide groove 826 may extend in the Z direction.

In an embodiment, the OIS actuator 815 may include a voice coil motor. An OIS coil 828 may be disposed at the OIS base 812, and an OIS magnet 830 opposing the OIS coil 828 may be disposed at the OIS holder 814. When a current flows in the OIS coil 828, the OIS holder 814 may move in the Z direction and/or the X direction with respect to the OIS base 812 due to electromagnetic interaction between the OIS coil 828 and the OIS magnet 830. In another example, the OIS actuator 815 may include an OIS magnet disposed at the OIS base 812, and an OIS coil disposed at the OIS holder 814 and opposing the OIS magnet.

In an embodiment, the OIS actuator 815 may include a first OIS actuator 815*a* and a second OIS actuator 815*b* configured to drive movement in the Z direction and the X direction, respectively. The first OIS actuator 815*a* and the second OIS actuator 815*b* may be disposed together on one side of the OIS holder 814 or may be disposed at different sides of the OIS holder 814. For example, the first OIS actuator 815*a* may be disposed at the OIS holder 814 in the −X direction or the +X direction with respect to a center of the OIS holder 814, and the second OIS actuator 815*b* may be disposed at the OIS holder 814 in the +Z direction or the −Z direction with respect to the center of the OIS holder 814. As another example, both the first OIS actuator 815*a* and the second OIS actuator 815*b* may be disposed at the OIS holder 814 in the −X direction or the +X direction with respect to the center of the OIS holder 814.

In an embodiment, the OIS driver 810 may further include a position sensor 832. The position sensor 832 may be positioned internally or externally of the OIS coil 828, and may be provided to detect the position of the image sensor 806. For example, the position sensor 832 may include a Hall sensor configured to measure the magnetic field of the OIS magnet 830. As another example, the position sensor 832 may include a coil disposed at a position opposite to the OIS magnet 830, and a position of the image sensor 806 may be detected using changes in inductance of the coil caused by the OIS magnet 830.

In an embodiment, the OIS coil 828 and/or the position sensor 832 may be attached to an OIS substrate 834 coupled to the OIS base 812. The OIS substrate 834 may be electrically connected to a connector board 836, and may transmit signals or power necessary for driving the OIS to the connector board 836 or may receive signals or power necessary for driving the OIS from the connector board 836.

In an embodiment, the OIS base 812 may have a yoke 838 disposed thereon. The yoke 838 may be disposed to oppose the OIS magnet 830 disposed at the OIS holder 814 in the Y direction. Magnetic attraction formed between the yoke 838 and the OIS magnet 830 may pull the OIS holder 814 toward the OIS base 812 side (the −Y direction).

The OIS guide 822 may be supported in the Y direction by the first ball member 818, and the OIS holder 814 may be supported in the Y direction by the second ball member 820. In an embodiment, the first ball member 818 may be provided at each of three or more points between the OIS base 812 and the OIS guide 822, and may stably support the OIS guide 822 in the Y direction while OIS is performed. That is, three or more first ball members 818 may be respectively disposed at three or more points between the OIS base 812 and the OIS guide 822. In an embodiment, the second ball member 820 may be provided at each of three or more points between the OIS guide 822 and the OIS holder 814, and may stably support the OIS holder 814 in the Y direction while OIS is performed. That is, three or more second ball members 820 may be respectively disposed at three or more points between the OIS guide 822 and the OIS holder 814.

Magnetic attraction between the yoke 838 and the OIS magnet 830 may allow the first ball member 818 to be maintained in contact with the OIS base 812 and the OIS guide 822, and may allow the second ball member 820 to be maintained in contact with the OIS holder 814 and the OIS guide 822. That is, the first ball member 818 and the second ball member 820, being disposed between the OIS holder 814 and the OIS base 812, may be maintained in contact with the first guide groove 824 and the second guide groove 826, respectively, which may prevent the OIS holder 814 from moving in a direction (Y direction) other than the Z direction or the X direction when the OIS is driven, and may thus contribute to the camera module 800 obtaining an image of excellent quality.

In the embodiment illustrated in FIG. 10, the camera module 800 the OIS driver 810 may be similar to the OIS drivers 410 and 510 in the embodiments in FIGS. 4 and 5. Alternatively, the camera module 800 may include an OIS driver similar to the OIS drivers 210 and 310 in the embodiments in FIGS. 2 and 3.

In an embodiment, the AF driver 808 may include an AF base 840, an AF carrier 842, and an AF actuator 844. The AF carrier 842 may be fastened to the lens module 802. Alternatively, the AF carrier 842 may be integrated with the lens module 802. The AF carrier 842 may be configured to move in the optical axis direction (the X direction) with respect to the AF base 840.

In an embodiment, a third ball member 846 may be disposed between the AF carrier 842 and the AF base 840. The AF carrier 842 and/or the AF base 840 may include a third guide groove configured to accommodate at least a portion of the third ball member 846. The third guide groove disposed in the AF carrier 842 or the AF base 840 may extend in the X direction. Since the third ball member 846 moves along the third guide groove, the moving direction of the AF carrier 842 with respect to the AF base 840 may be limited to the direction (X direction) in which the third guide groove extends.

In an embodiment, a damper 850 may be disposed at a front side and a rear side of the AF carrier 842. The damper 850 may be configured to alleviate noise or impact generated by the AF carrier 842 colliding with other structures when the AF carrier 842 moves in the optical axis direction. For example, the damper 850 may be formed of a material having elasticity, such as rubber or silicone.

In an embodiment, the AF actuator 844 may include a voice coil motor. The AF actuator 844 may include an AF coil 852 disposed at the AF base 840, and an AF magnet 854 disposed at the AF carrier 842 to oppose the AF coil 852. The AF coil 852 and the AF magnet 854 may oppose each other in a direction perpendicular to the optical axis. Due to electromagnetic interaction between the AF coil 852 and the AF magnet 854 formed when a current flows through the AF coil 852, the AF carrier 842 may move in the optical axis (the X axis) direction with respect to the AF base 840.

In an embodiment, the AF actuator 844 may be disposed at each of both sides of the AF carrier 842. The first AF actuator 844*a* may be disposed at the −Y direction of the AF carrier 842 with respect to a center of the AF carrier 842, and the second AF actuator 844*b* may be disposed at the +Y direction of the AF carrier 842 with respect to the center of the AF carrier 842.

In an embodiment, the AF driver 808 may further include the position sensor 856. The position sensor 856 may be positioned internally or externally of the AF coil 852, and may be configured to detect a position of the lens module 802 on the optical axis. For example, the position sensor 856 may include a Hall sensor configured to measure a magnetic field of the AF magnet 854. As another example, the position sensor 856 may include a coil disposed at a position opposite to the AF magnet 854, and a position of the lens module 802 may be detected based on changes in inductance of the coil caused by the AF magnet 854.

In an embodiment, the AF coil 852 and/or the position sensor 856 may be attached to an AF substrate 858 coupled to the AF base 840. The AF board 858 may be electrically connected to the connector board 836, and may transmit signals or power necessary for driving the AF to the connector board 836 or may receive signals or power necessary for driving the AF from the connector board 836.

In an embodiment, the AF carrier 842 and the AF base 840 may include magnetic members in portions opposing each other. For example, a first magnetic member 860 may be disposed on a surface of the AF carrier 842 directed in the Z direction, and a second magnetic member 862 opposing the first magnetic member 860 in the Z direction may be disposed at the AF base 840. Magnetic attraction may be formed between the first magnetic member 860 and the second magnetic member 862. For example, the first magnetic member 860 may be a magnet and the second magnetic member 862 may be a yoke. As another example, the first magnetic member 860 may be a yoke and the second magnetic member 862 may be a magnet. The magnetic attraction formed between the first magnetic member 860 and the second magnetic member 862 may pull the AF carrier 842 toward the AF base 840 side (e.g., +Z direction or −Z direction).

In an embodiment, the AF magnet 854 may function as the first magnetic member 860. In this case, the second magnetic member 862 may be disposed at the AF base 840 to oppose the AF magnet 854 in the Z direction.

The third ball member 846 disposed between the AF carrier 842 and the AF base 840 may be configured to support the AF carrier 842 in the Y direction. In an embodiment, the third ball member 846 may be disposed at each of three or more points between the AF carrier 842 and the AF base 840 and may stably support the AF carrier 842 in the Z direction while AF is performed. That is, three or more third ball members 846 may be respectively disposed at three or more points between the AF carrier 842 and the AF base 840.

Magnetic attraction between the first magnetic member 860 and the second magnetic member 862 may allow the third ball member 846 to be maintained in contact with the AF base 840 and the AF carrier 842. That is, the third ball member 846 disposed between the AF carrier 842 and the AF base 840 may be maintained in contact with the third guide groove, which may prevent the AF carrier 842 from moving in a direction other from the X-axis when the AF is driven, and may thus contribute to the camera module 800 obtaining an image of excellent quality.

In an embodiment, alternatively, the camera module 800 may include an AF driver similar to the AF drivers 508 and 608 in FIG. 7 or FIG. 8 and different from the AF driver 808 illustrated.

In an embodiment, a second reflective member 805 may be disposed in the third direction (the +Y direction) toward an imaging plane 806*a* of the image sensor 806 with respect to the OIS base 812. In an example embodiment, the OIS base 812, the first and second ball members 818 and 220, and the OIS holder 814 may be stacked in order in a fourth direction opposite to the third direction (−Y direction). Specifically, the first ball member 818 may be seated on the OIS holder 814 (or the first guide groove 824 configured in the OIS holder 814) in the fourth direction, and the OIS guide 822 may be seated on the first ball member 818 in the fourth direction. The second ball member 820 may be seated on the OIS guide 822 (or the second guide groove 826 configured in the OIS guide 822 in the fourth direction, and the OIS holder 814 may be on the second ball member 820 in the fourth direction.

The OIS holder 814 may be pulled toward the OIS base 812 by magnetic attraction between the OIS magnet 830 disposed at the OIS holder 814 and the yoke 838 disposed at the OIS base 812. That is, the OIS holder 814 may be pulled in the third direction (the +Y direction).

In an embodiment, an OIS cover 866 may be further disposed at the OIS driver 810. The OIS cover 866 may be mounted on the OIS base 812 and may be disposed on the OIS holder 814 in the −Y direction. The OIS cover 866 may prevent the OIS holder 814 from being separated in the −Y direction.

In an embodiment, an optical filter 868 may be further disposed on the image sensor 806. The optical filter 868 may include a UV blocking filter. Light passing through the lens module 802 may pass through a UV blocking filter and may reach the image sensor 806.

In an embodiment, the OIS base 812 may be disposed on the connector board 836. Since the image sensor 806 moves with respect to the OIS base 812 according to the OIS driving, the image sensor 806 may be electrically connected to the connector board 836 through a flexible board 870. The connector board 836 may be fastened to another structure 872.

According to the aforementioned embodiments, a camera module may obtain high-quality images through AF or OIS with improved performance.

Additionally, a camera module may provide an OIS driver of a sensor shift method having high reliability.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:

an optical image stabilization (OIS) base;

an OIS holder movably coupled to the OIS base in a first direction perpendicular to an optical axis, and fixedly coupled to an image sensor;

a first OIS actuator, configured to shift the image sensor in the first direction, comprising a first coil and a first magnet opposing each other in either one of the first direction and a second direction perpendicular to the optical axis and intersecting the first direction;

an OIS guide interposed between the OIS base and the OIS holder;

an auto focus (AF) carrier, movably coupled to an AF base, accommodating a lens module, wherein the image sensor is configured to move in the first direction relative to the lens module; and a plurality of ball members, wherein one of the plurality of ball members is disposed between the OIS base and the OIS guide, and another of the plurality of ball members is disposed between the OIS guide and the OIS holder to make the OIS holder and the image sensor movable relative to the OIS base; and a yoke disposed at the OIS base and opposing the first magnet in a third direction parallel to the optical axis, wherein the OIS holder is configured to be pulled toward the OIS base by attractive force between the yoke and the first magnet, and wherein the attractive force maintains the one of the plurality of ball members in contact with the OIS base and the OIS guide and maintains the another of the plurality of ball members in contact with the OIS guide and the OIS holder, wherein the first coil is disposed at one of the OIS holder and the OIS base, and the first magnet is disposed at the other of the OIS holder and the OIS base, and wherein the one of the plurality of ball members is configured to roll in one direction among the first direction and the second direction, and the another of the plurality of ball members is configured to roll in the other direction among the first direction and the second direction.

2. The camera module of claim 1, further comprising:

an AF actuator configured to move the lens module in a direction parallel to the optical axis, and including an AF coil disposed at the AF base, and an AF magnet disposed at the AF carrier.

3. The camera module of claim 2, wherein the AF base is disposed in the third direction that an imaging plane of the image sensor faces with respect to the OIS base, and wherein the OIS base, the one of the plurality of ball members, the another of the plurality of ball members, and the OIS holder are stacked in order in the third direction.

4. The camera module of claim 3, further comprising:

an OIS cover disposed between the OIS base and the AF base, and configured to prevent the OIS holder from being separated in the third direction.

5. The camera module of claim 2, wherein the AF base is disposed in a the third direction that an imaging plane of the image sensor faces with respect to the OIS base, and wherein the OIS base, the one of the plurality of ball members, the another of the plurality of ball members, and the OIS holder are stacked in order in a direction opposite to the third direction.

6. The camera module of claim 1, wherein the OIS holder is movably coupled to the OIS base in the second direction, wherein the camera module further comprises a second OIS actuator configured to shift the image sensor in the second direction, wherein the second OIS actuator includes a second magnet and a second coil opposing each other in either one of the first direction and the second direction, and wherein the second coil is disposed at one of the OIS holder and the OIS base, and the second magnet is disposed at the other of the OIS holder and the OIS base.

7. The camera module of claim 1, wherein a first ball member is disposed at the OIS base or the OIS guide and is configured to roll along a first guide groove extending in one direction among the first direction and the second direction, and wherein a second ball member is disposed at the OIS holder or the OIS guide and is configured to roll along a second guide groove extending in the other direction among the first direction and the second direction.

8. The camera module of claim 1, further comprising:

a reflective member configured to change a direction of light incident to the image sensor.

9. The camera module of claim 8, wherein the lens module is disposed at one side of the reflective member, and wherein the reflective member is configured to change light passing through the lens module to be directed to the image sensor.

10. The camera module of claim 9, wherein the reflective member is disposed in the third direction toward the imaging plane of the image sensor with respect to the OIS base, and wherein the OIS base, the one of the plurality of ball members, the another of the plurality of ball members, and the OIS holder are stacked in order in the third direction.

11. The camera module of claim 10, further comprising:

an OIS cover disposed on the OIS base and configured to prevent the OIS holder from being separated in the third direction.

12. The camera module of claim 9, wherein the AF base is disposed in a the third direction that the imaging plane of the image sensor faces with respect to the OIS base, and wherein the OIS base, the one of the plurality of ball members, the another of the plurality of ball members, and the OIS holder are stacked in order in a direction opposite to the third direction.

13. A camera module, comprising:

an OIS base;

an OIS holder movably coupled to the OIS base in at least one direction perpendicular to the optical axis and fixedly coupled to an image sensor;

a lens module, wherein the image sensor is configured to move in the at least one direction relative to the lens module;

an OIS actuator, configured to shift the image sensor in the at least one direction perpendicular to the optical axis, comprising a magnet;

an OIS guide interposed between the OIS base and the OIS holder; and a plurality of ball members, wherein one of the plurality of ball members is disposed between the OIS base and the OIS guide, and another of the plurality of ball members is disposed between the OIS guide and the OIS holder to make the OIS holder and the image sensor movable relative to the OIS base; and a yoke disposed at the OIS base and opposing the magnet in a direction parallel to the optical axis, wherein the OIS holder is configured to be pulled toward the OIS base by attractive force between the yoke and the magnet, and wherein the attractive force maintains the one of the plurality of ball members in contact with the OIS base and the OIS guide and maintains the another of the plurality of ball members in contact with the OIS guide and the OIS holder, wherein either one of the OIS base and the OIS holder includes a receiving portion extending in the direction parallel to the optical axis to receive a portion of the lens module, and wherein the one of the plurality of ball members is configured to roll in one direction among the at least one direction and another direction perpendicular to the optical axis and intersecting the at least one direction, and the another of the plurality of ball members is configured to roll in the other direction among the at least one direction and the another direction.

14. The camera module of claim 13, wherein the OIS actuator is disposed in the OIS base and the OIS holder.

15. The camera module of claim 13, wherein the OIS actuator further includes a coil disposed at one of the OIS holder and the OIS base, and the magnet disposed at the other of the OIS holder and the OIS base, and wherein the coil and the magnet oppose each other in a direction among the at least one direction perpendicular to the optical axis.

16. A camera module, comprising:

an optical image stabilization (OIS) base;

an OIS holder coupled to the OIS base;

an image sensor attached to OIS holder and configured to move together with the OIS holder;

an OIS actuator configured to move the OIS holder with respect to the OIS base in first and second directions perpendicular to a direction in which light is incident to the image sensor, wherein the OIS actuator includes a first coil and a first magnet opposing each other in the first direction perpendicular to an optical axis;

an OIS guide interposed between the OIS base and the OIS holder;

a plurality of ball members, wherein one of the plurality of ball members is disposed between the OIS base and the OIS guide, and another of the plurality of ball members is disposed between the OIS guide and the OIS holder to make the OIS holder and the image sensor movable relative to the OIS base;

an auto focus (AF) carrier, movably coupled to an AF base, accommodating a lens module, wherein the image sensor is configured to move in the first and second directions relative to the lens module; and a yoke disposed at the OIS base and opposing the first magnet in a third direction parallel to the optical axis, wherein the OIS holder is configured to be pulled toward the OIS base by attractive force between the yoke and the first magnet, and wherein the attractive force maintains the one of the plurality of ball members in contact with the OIS base and the OIS guide and maintains the another of the plurality of ball members in contact with the OIS guide and the OIS holder, wherein the first coil is disposed at one of the OIS holder and the OIS base, and the first magnet is disposed at the other of the OIS holder and the OIS base, and wherein the one of the plurality of ball members is configured to roll in one direction among the first direction and the second direction, and the another of the plurality of ball members is configured to roll in the other direction among the first direction and the second direction.

17. The camera module of claim 16, wherein the OIS actuator further includes a second coil and a second magnet opposing each other in the second direction.

18. The camera module of claim 16, further comprising:

an AF actuator configured to move the lens module in the third direction parallel to an the optical axis.

19. The camera module of claim 16, wherein the OIS holder is configured to move with respect to the OIS guide in one of the first and second directions, and wherein the OIS guide is configured to move with respect to the OIS base in the other of the first and second directions.

* * * * *